Oct. 30, 1934.  J. B. HENDERSON ET AL  1,979,155
APPARATUS FOR SIGHTING AND CONTROLLING GUNS
Filed Feb. 13, 1930   11 Sheets-Sheet 1

INVENTORS
JAMES BLACKLOCK HENDERSON
& ARTHUR LEONARD PERHAM
BY
ATTORNEYS

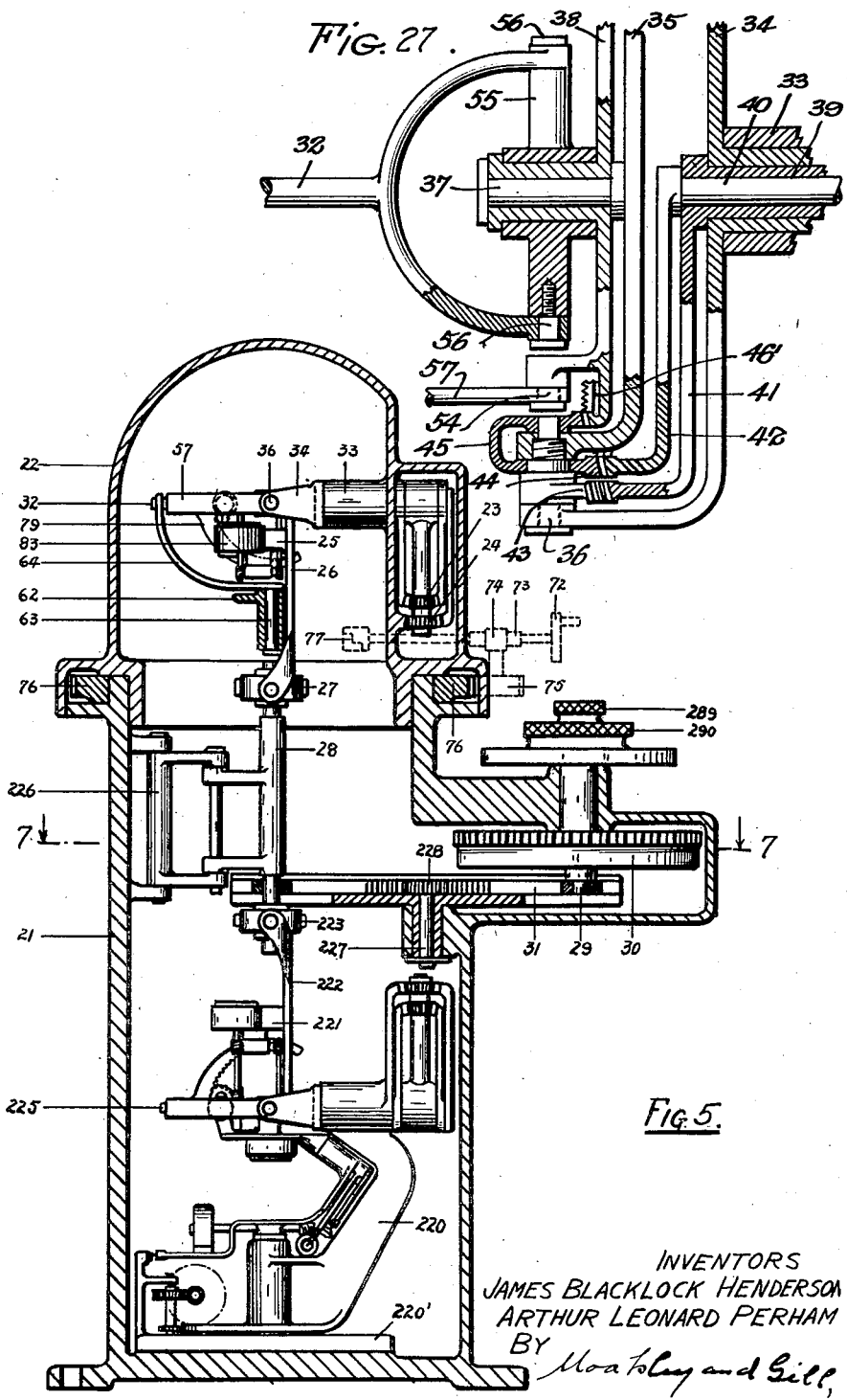

INVENTORS
JAMES BLACKLOCK HENDERSON
ARTHUR LEONARD PERHAM
By Moahley and Gill
ATTORNEYS

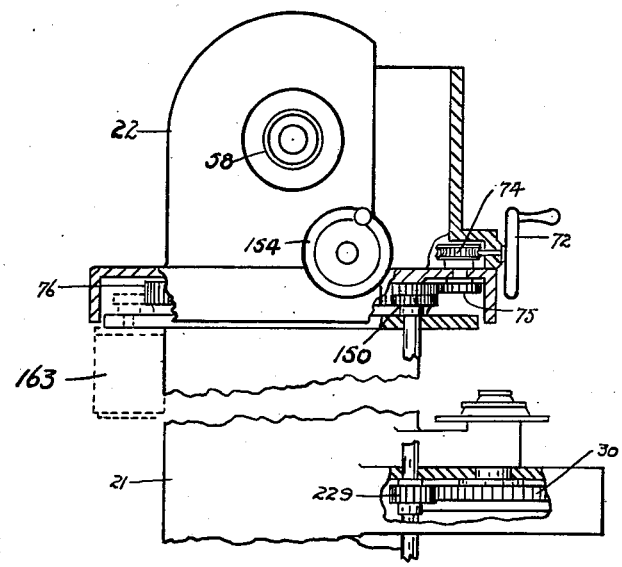
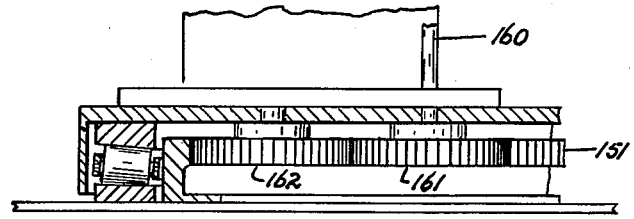
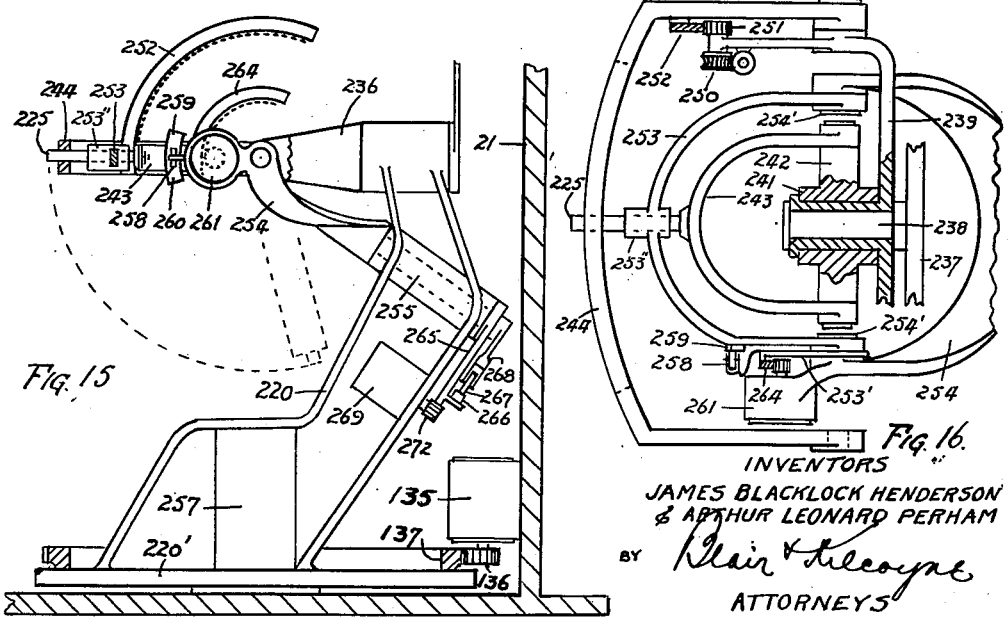

INVENTORS.
JAMES BLACKLOCK HENDERSON
ARTHUR LEONARD PERHAM
ATTORNEYS

Oct. 30, 1934.  J. B. HENDERSON ET AL  1,979,155
APPARATUS FOR SIGHTING AND CONTROLLING GUNS
Filed Feb. 13, 1930   11 Sheets-Sheet 9

INVENTORS
JAMES BLACKLOCK HENDERSON
ARTHUR LEONARD PERHAM
BY
ATTORNEYS

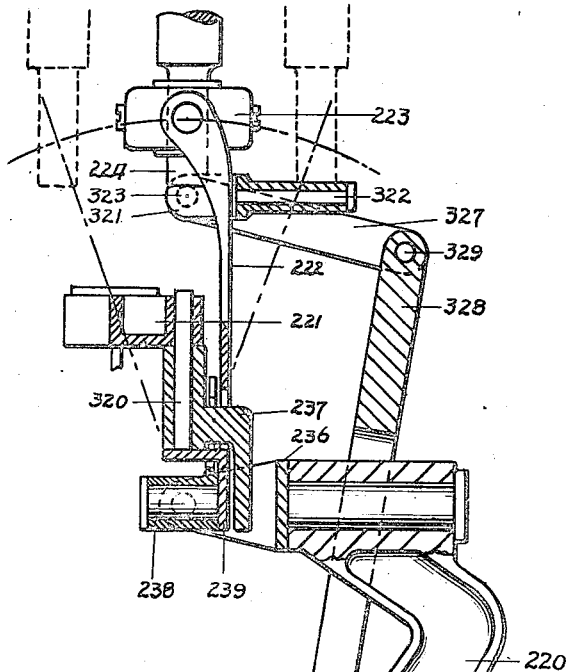
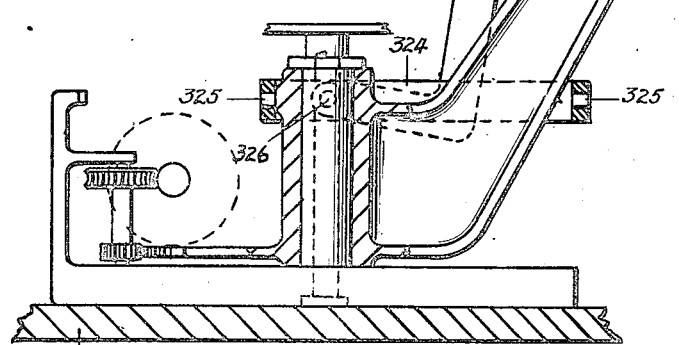
FIG. 23
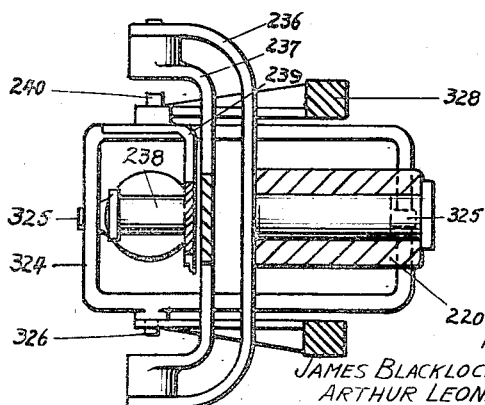
FIG. 24.
INVENTORS
JAMES BLACKLOCK HENDERSON
ARTHUR LEONARD PERHAM

UNITED STATES PATENT OFFICE 1,979,155

APPARATUS FOR SIGHTING AND CONTROLLING GUNS

James Blacklock Henderson and Arthur Leonard Perham, London, England

Application February 13, 1930, Serial No. 428,177
In Great Britain February 13, 1929

29 Claims. (Cl. 33—49)

Our invention relates to improvements in apparatus for sighting and controlling guns, especially anti-aircraft guns. In these or other guns provided with a degree of freedom greater than the ordinary training movement about a normally vertical axis and elevation about a normally horizontal axis, the third pivotal suspension of the gun facilitates the cross-levelling or cross-tilting of the gun trunnions and enables an aircraft target at or near the zenith to be more effectively engaged. For thus engaging aircraft targets in the overhead zone of fire, guns suspended on gimbals have been proposed and other means of pivotal suspension having similar results have also been suggested. The present invention is concerned with the problem of sighting and directing such guns, and its object is to provide a general solution of the difficulties involved, irrespective of the particular system of pivotage employed.

An anti-aircraft gun requires to be pointed in such a direction that the target and shell will occupy the same position at the same time, this position being called the future target position. The object of our invention is to provide means for ascertaining at any moment and in a continuous manner the angular adjustments of the gun necessary to enable it to be correctly directed relatively to the present target position so as to hit the target in its future position, these adjustments being appropriate to the specific system of pivotage employed.

The problem to be solved is a difficult one on account of (a) the rapid motion of the target, involving large angular displacements of the gun relatively to the present line of sight, (b) the large angular changes in position of the target from the horizon to beyond the zenith, (c) the corresponding complicated variations of tangent elevation, (d) the complicated effects of wind in deflecting the target and the trajectory during the time of flight of the shell, and (e) the necessity for correctly defining the position of the gun axis relatively to the line of sight to the target with rapidity and without having to level either the gun or the sight.

Our solution of this problem is based essentially on the adoption of a novel datum of reference for determination of all necessary directions in space, such as the line of sight to the target or the required direction of the gun axis. This datum is independent of these directions and comprises two coordinate axes which we maintain in the horizontal plane irrespective of the supporting pedestal, sight or gun. Any known direction, such as the line of sight to the target, is referred to this datum by means of the angles of rotation of two imaginary planes pivoted on the datum coordinate axes and tilted from the vertical so as to intersect along the direction in question. Conversely a required direction can be determined in space by calculating the angular rotations from the vertical of two intersecting planes each containing the required direction and one of the datum axes. Having established our datum system with the axes in any convenient azimuth, we determine the angular rotations of the two planes tilted to contain the line of sight to the target, and having, by means of a predictor, deduced therefrom and from other data the corresponding angles defining the direction in space in which the gun axis must be pointed in order to hit the target, we use the latter angles to materialize that direction and to deduce therefrom the gimbal settings of the actual gun required to align it to the materialized direction.

This solution requires mechanism comprising more than one invention, and the present invention relates to the datum system of coordinate axes and the mechanism associated therewith.

The invention comprises primarily apparatus for sighting and/or controlling guns in which the datum of reference for directions in space consists of two horizontal coordinate axes not necessarily moving in azimuth with azimuthal movements of the sight or gun or of the direction referred to them. Our invention also comprises means to determine the angular rotations of planes pivoted on these axes and tilted to contain the referred direction, or alternatively, to determine a direction in space from known or calculated angles, also the means to stabilize the horizontal coordinate axes on a tilting pedestal or rolling ship and the means to convert rotational angles of the planes tilting around the coordinate axes into gimbal settings of a gun or settings relatively to any system of axes other than the datum coordinate axes. We may employ two separate systems of datum axes, both horizontal, referring the line of sight to the target to one of these systems and the direction of the gun axis to the other, the azimuthal relation between the corresponding axes of each system being variable and determinable.

For purposes of our solution, we assume, as is customary, that during the short time of flight of the shell the target will maintain constant height, speed and course, and we consider the present and future positions of the target as in a horizontal plane. Thus the distance between the present and future target positions will be the product of the target speed and the time of flight of the shell in travelling from the gun to meet the target.

As a datum of reference we imagine a system of three coordinate axes OX, OY and OZ, the origin O being at the observer, OX and OY being at right angles to each other and horizontal and OZ vertical. In the sighting mechanism we stabilize a small platform horizontally and on it we mount two horizontal trunnions at right angles to each other to represent mechanically the coordinate axes OX and OY, their azimuth being left to the convenience of the observer who can train them in azimuth round the vertical axis OZ or, if preferred or required, their azimuth may be controlled by the compass in reference to cardinal or other points.

In order to define the present position of the target or the line of sight to the target in relation to this datum system, we pivot at O, the intersection of the OX and OY trunnions, an arm which we call the "sight arm", whose direction is controlled by two members pivoted respectively on the two trunnions OX and OY and representing mechanically two planes pivoted on the two datum axes OX and OY, and we control the line of sight of the sighting telescopes by this sight arm in such a way that it is always parallel to the sight arm, so that when the telescopes are correctly directed on the target the sight arm is also pointed directly at the target. The two members pivoted on the trunnions OX and OY represent, as stated, planes pivoted on the datum axes OX and OY, and since the sight arm is controlled by these members so as to lie in both planes, its position must necessarily denote the line of intersection of the two planes, and when the sight arm and line of sight are directed at the target, the movements of the two pivoted members necessary to produce this effect are exactly equal to the angular rotations of the two imaginary tilting planes, measured from the vertical, to cause them to intersect along the line of sight to the target. We shall call these imaginary planes the X and Y planes respectively, and the angles through which they rotate from the vertical the X and Y angles, the X plane rotating round the axis OX through an X angle, and similarly the Y plane rotating through angle Y round the axis OY. By the operation of keeping the sighting telescopes continuously on the target we therefore define the present line of sight as the intersection of two planes tilted at the measured angles X and Y respectively round their respective axes OX and OY, the azimuth of these axes being fixed by the operator or by the compass or being otherwise known.

At low elevations of the line of sight it is inconvenient, and at zero elevation impossible, to use the crosswise adjustment of the Y plane about its horizontal axis OY. In that case we prefer to train the sight so that the line of sight lies in the vertical plane of OY, that is to say, the Y angle is zero and the line of sight is then defined simply by the X angle or its complementary elevation from the horizontal, which is the usual procedure. This, however, is merely a particular case of the general system of identification which we employ, whereby directions in space relatively to the observer are defined at the sight by the X and Y angles of planes pivoted on the axes OX and OY and rotated so that they intersect along the direction in question.

Having thus determined the direction of the line of sight, the particular position of the target along that line is then fixed if either the height, the direct range or the horizontal component range, is known. It is immaterial which of these bases of determination is adopted so long as the mechanism used for its application is suitable. Hereinafter for purposes of explanation we shall take target height as the determining factor.

The next part of our mechanism is the predictor to which the sight operators, in keeping their sights directed on the target, transmit the X and Y angles of the line of sight and the azimuth of the OX and OY axes.

For a complete description of a preferred predictor reference may be made to our copending application, Serial No. 500,402, filed Dec. 5, 1930, but for the present it may be sufficient to explain that the predictor combines the received X and Y angles with data of target height, wind velocity and direction, target course and speed, velocity and direction of movement, if any, of the gun, also with ballistic data pertaining to the gun and projectile, and derives therefrom the X' and Y' angles of an imaginary point, which we call the "gun axis position" on the line of the gun axis produced when the gun is aligned with the required direction to hit the target in its future position. These X' and Y' angles are determined in relation to two horizontal coordinate axes O'X' and O'Y' disposed in azimuth relatively to OX and OY in directions selected by the predictor as convenient axes of reference for the gun and the "gun axis position". That is to say, O'X' and O'Y' may or may not coincide with OX and OY respectively according to the circumstances of the moment, but any azimuthal difference between them is determined by the predictor and not by the operators of the sight who control the axes OX and OY. The ultimate output of the predictor, therefore, which is transmitted to the conversion unit is (1) the azimuthal difference, if any, between O'X' and OX, and (2) the X' and Y' angles of the gun axis position at which the gun axis must be pointed in order to hit the target whose present position is given by the X and Y angles measured by the sight relatively to OX and OY. It should be further explained, however, that our present invention, and particularly our conversion unit now to be referred to, does not necessarily entail the use of the particular type of predictor described in our copending application, Serial No. 500,402, but can also be used in combination with any predictor which determines the required direction of the gun axis in relation to any fixed plane of reference.

The third and last part of our mechanism is what we call the "conversion unit". Just as we used the sight arm to materialize the line of sight and to determine the X and Y angles, so we also employ a similar but oppositely-operating mechanism to apply the X' and Y' angles to a member, which we call the "ideal gun", so as to materialize the direction of the gun axis position. The conversion unit, of which the ideal gun forms part, is housed in the same pedestal as the sighting unit, as thereby the mechanism is considerably simplified, but it can be arranged separately if required. In the pedestal we mount a small turntable on which we support on gimbals a horizontally stabilized platform which carries two mutually perpendicular horizontal trunnions representing the O'X' and O'Y' axes. The ideal gun is universally pivoted on their intersection O' and its position is controlled by members representing X' and Y' planes pivoted respectively on the trunnions O'X' and O'Y'. To these members the X' and Y' angles determined by the predictor are applied so that the ideal gun will point straight to the gun axis position, provided the trunnions O'X' and O'Y' occupy the position in azimuth determined by the swinging crank discs in the predictor, already referred to. For this purpose we may mount the pedestal which carries the sighting and conversion units on the training platform of the actual gun but with the sighting unit turntable geared to the gun training rack by an eliminating gear so that its azimuth is not disturbed by any training movement of the gun. The pedestal, however, and the ideal gun turntable train with the gun, and the azimuth determined by the predictor is transmitted direct to the gun training pointer, so that the gun, in training so as to keep its pointers in line, trains the pedestal, the ideal gun platform and the trunnions O'X' and O'Y' to the azimuth determined by the predictor, while the sight turntable and the sight trunnions OX and OY, thanks to the eliminating gear, remain fixed in azimuth. The sight arm will therefore remain pointed straight at the present position of the target while the ideal gun will be pointed straight at the gun axis position.

We have now to determine the settings which must be applied to the actual gun to align it with the ideal gun. For this purpose we mount in the conversion unit a "dummy gun" whose gimbal centre is at O' and whose system of pivotage is an exact miniature replica of that of the actual gun. By electrical or other means we cause the dummy gun to align its axis with that of the ideal gun and the displacements of its miniature pivotage in doing so must be the necessary displacements to be applied to the corresponding elements of the pivotage of the real gun. If the actual and dummy guns have three degrees of freedom, as is usual in antiaircraft guns, it is obvious that if only the axis of the dummy gun is constrained to that of the ideal gun, for every position of the latter there are many alternative positions of the dummy gun gimbals, all of which would serve to align the gun axis with the required direction but many of which might be inconvenient or dangerous to apply to the actual gun. Out of these many solutions we wish to select a single solution only for each particular position of the ideal gun. To this end we constrain two axes of the dummy gun. In addition to constraining its barrel along the axis of the ideal gun we constrain one of its pivotal trunnion axes to a corresponding trunnion axis of the ideal gun. For instance, we may constrain its elevation trunnions to the normally horizontal trunnions of the ideal gun so that they will be tilted through the Y' angle about the axis O'Y'. In these circumstances for each position of the ideal gun there is only one possible position of the dummy gun pivotage, and the angular displacements of the dummy gun pivotage relatively to themselves and to the platform are transmitted to the actual gun, so that in lining up their pointers, the gun operators align their gun barrel parallel to the ideal gun, i. e. the actual gun is pointed straight at the required gun axis position.

Up to this point we have entirely neglected the question of tilt of the gun and of the sight pedestal, assuming for purposes of preliminary explanation that all the respective training axes are truly vertical. Our mechanism, however, contains means to deal satisfactorily with tilt and its effect on all parts of the mechanism. The sight arm and ideal gun, as has been stated, are carried on small platforms carrying respectively the OX, OY, O'X' and O'Y' trunnions and it is necessary to keep these trunnions horizontal at all times. For that purpose the small platforms are mounted on their respective turntables on gimbals, but since it is known that a gimballed member is displaced in azimuth by the process of levelling if the axis round which the undesired tilt has occurred is inclined to both gimbal trunnions, and since it is necessary that the azimuth of our datum trunnions shall not be so disturbed, we employ for their support a special system of double gimbals by the use of which the correction of tilt of the pedestal and turntables produces no displacement in azimuth of the supported stabilized platforms with their datum trunnions. A further useful effect of this method of support is that any training displacement of either turntable about a tilted training axis produces an exactly equal displacement of the double gimballed platform and datum axes in azimuth. This tilt correction has to be applied to the platforms of both the sight arm and ideal gun, and it is for this reason that we prefer to mount both the sighting unit and the conversion unit, of which the ideal gun forms part, in the same pedestal so that a single tilt correction may suffice for both. Actually in the preferred form of our mechanism, as will be explained more fully later, we only level the sight arm platform and by a peculiar arrangement of the ideal gun platform we compensate the effect of tilt by doubling its angle of tilt from the horizontal together with the application of fixed training angle of 180° between the axis of the ideal gun and the direction of the gun axis position. We may, however, keep both platforms truly level but whichever method we apply the effects of tilt of the pedestal and of the training axis of the actual gun are always eliminated from the sight arm and are either completely eliminated or completely compensated in the ideal gun.

We have stated that we keep the axis of the ideal gun pointed at the gun axis position, but this statement may not be invariably true. The dummy gun is carried by a gimbal system which is a small scale replica of that of the actual gun, and its barrel and, say, its elevation trunnions are constrained to those of the ideal gun. Since the pivotage of the dummy gun is not a double gimballed one, the angular movements of its barrel or trunnions relatively to the unconstrained parts of the gun mounting, the constrained parts being fixed in azimuth by the ideal gun, must produce a displacement in training of the unconstrained parts unless the relative displacement of the constrained parts is about one of the gimbal axes. These relative movements of the constrained parts take place either when the tilt correction is acting or when a Y' angle is applied to the elevation trunnions of the dummy gun, and the consequent training displacement of the dummy gun mounting must be applied to that of the actual gun. We therefore cause this training displacement of the dummy gun mounting to operate a switch between it and the pedestal which causes a motor to train the dummy gun mounting and the ideal gun relatively to the pedestal so that both the ideal and dummy guns are displaced in training from the gun axis position. This displacement is then communicated to the actual gun pointers, via the predictor preferably, and the actual gun, in performing the required training movement, trains the pedestal, ideal gun and dummy gun into alignment with the gun axis position.

This, or any other, training displacement of the actual gun has no effect on the tilt correction applied to the sight and ideal gun because of the particular correcting means employed. So long as the tilt of the gun training axis and pedestal central axis is constant, the tilt correction, once set, accommodates itself to every training movement of the gun and pedestal and holds good in all positions until the angle or direction of the tilt alters, when it has to be reset. For use on board ships where a fixed tilt is out of the question on account of the continual rolling and pitching of the ship, we would preferably employ a gyroscopic system of stabilization of the datum trunnions OX, OY, O'X' and O'Y'. On board ship also the pedestal which carries the sighting and conversion units would preferably be mounted on the deck and not on the training turntable or turret of the actual gun. In that case no eliminating gear would be required for the sighting unit and the training movement of the actual gun turret would be applied to the dummy gun mounting and not to its supporting pedestal. Alternatively the predictor could control the training of the dummy gun, and the final displacements of the dummy gun could be conveyed directly to the pointers at the actual gun instead of via the predictor.

In order that our invention may be clearly understood we have illustrated a preferred form and certain modifications in the accompanying drawings, in which Fig. 1 is a diagram in plan of the system of using polar coordinates to determine the present and future positions of the target at low elevations.

Fig. 5 shows a side elevation, part sectioned on its central axis, of a form of pedestal to contain the sighting and conversion units with their tilt correction mechanism. For clearness the sighting mechanism has been omitted.

Fig. 6 contains the same elements as Fig. 5, but shows an alternative form of tilt correction.

Fig. 7 is a plan of the tilt corrector mechanism, the view being downwards on the line 7—7 of Fig. 5.

Fig. 8 is an enlarged and part sectioned elevation of the sight arm gimbal gear, the section being on the central vertical axis of the pedestal.

Fig. 9 is a part sectioned plan of the Fig. 8 mechanism, the section being on the line 9—9 of that figure.

Fig. 10 is an enlarged elevation of the conversion unit, part sectioned in its central vertical axis.

Fig. 11 is a plan of the conversion unit, part section on the line 11—11 of Fig. 10.

Fig. 12 is an elevation, part sectioned on the central vertical axis of the pedestal, of the sighting mechanism omitted from Fig. 5, the view being from the right hand side of Fig. 5.

Fig. 13 is a plan of the sighting mechanism.

Fig. 14 shows the connection between the gun training rack, the sight training rack and the tilt corrector gear.

Fig. 15 shows some alternative constructions relating to the sighting and conversion units.

Fig. 16 shows in plan part of the mechanism of Fig. 15.

Fig. 17 shows a type of clinometer for measuring the amount and direction of tilt of the pedestal.

Figure 18:
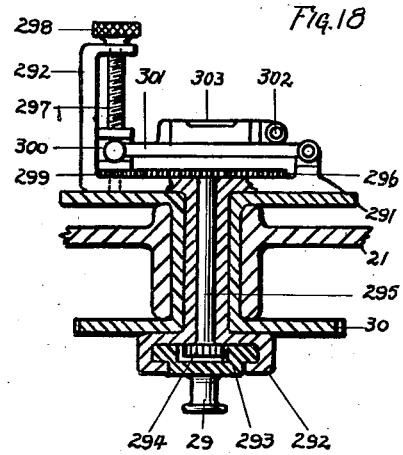

Fig. 18 shows in part-sectional elevation an alternative form of clinometer adapted to be incorporated in the variable-throw crank disc 30 of Fig. 5.

Figure 19:
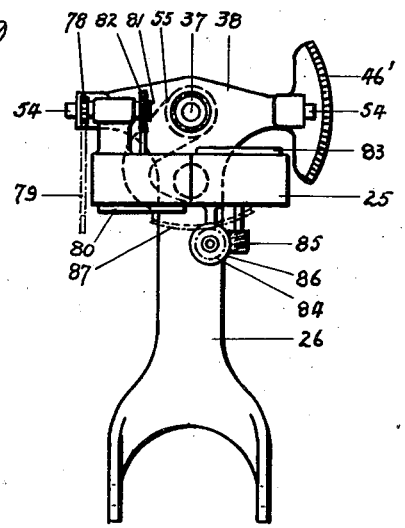

Fig. 19 is an elevation of the levelled frame 38 of the sight arm gear, the view being from the left of Fig. 5.

Figure 20:
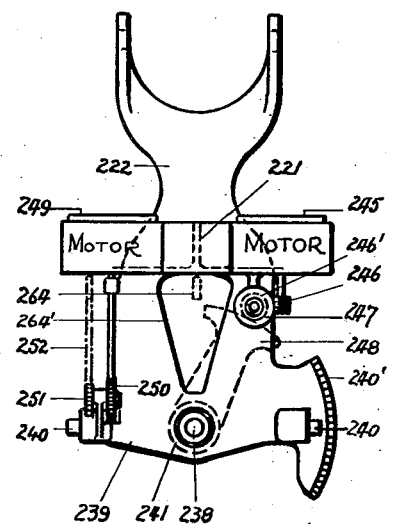

Fig. 20 is a similar elevation of the levelled frame 239 of the conversion unit viewed from the left of Fig. 5.

Figure 21:
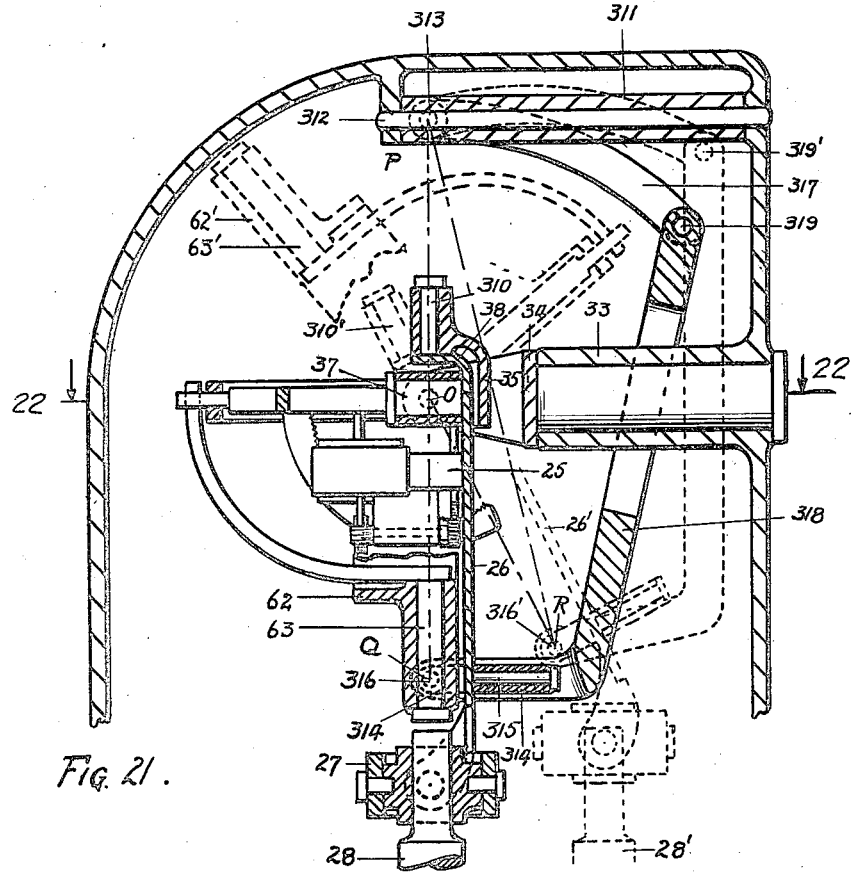

Fig. 21 is a part sectioned elevation of an alternative system of gimbal support of the sight arm datum trunnions.

Figure 22:
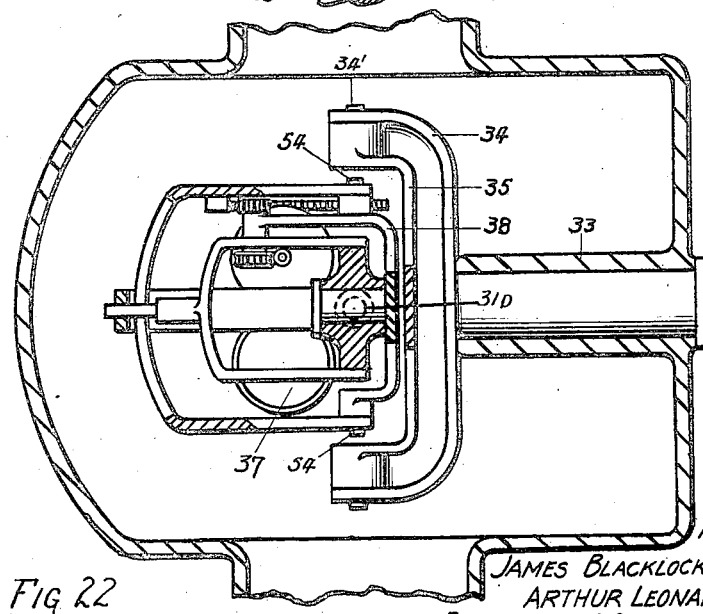

Fig. 22 is a plan of the same mechanism, part sectioned on the line 22—22 of Fig. 21.

Fig. 23 is an elevation and Fig. 24 a plan, both part sectioned, of an alternative gimbal support of the ideal gun datum trunnions.

Figure 25:
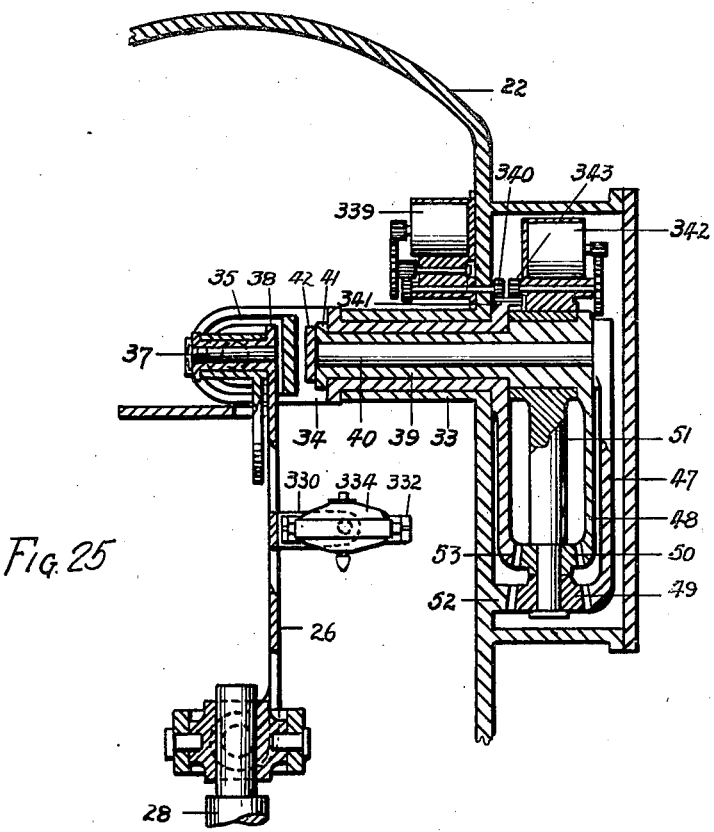

Fig 25 is a part sectional elevation of part of the sighting unit to show a gyroscopic method of applying the tilt correction.

Figure 26:
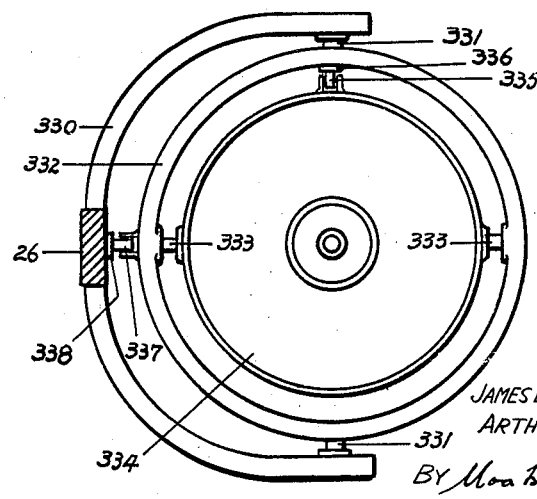

Fig. 26 is a plan of the gyroscope 334 of Fig. 25, showing its gimbal system and switching arrangement.

Figure 9:
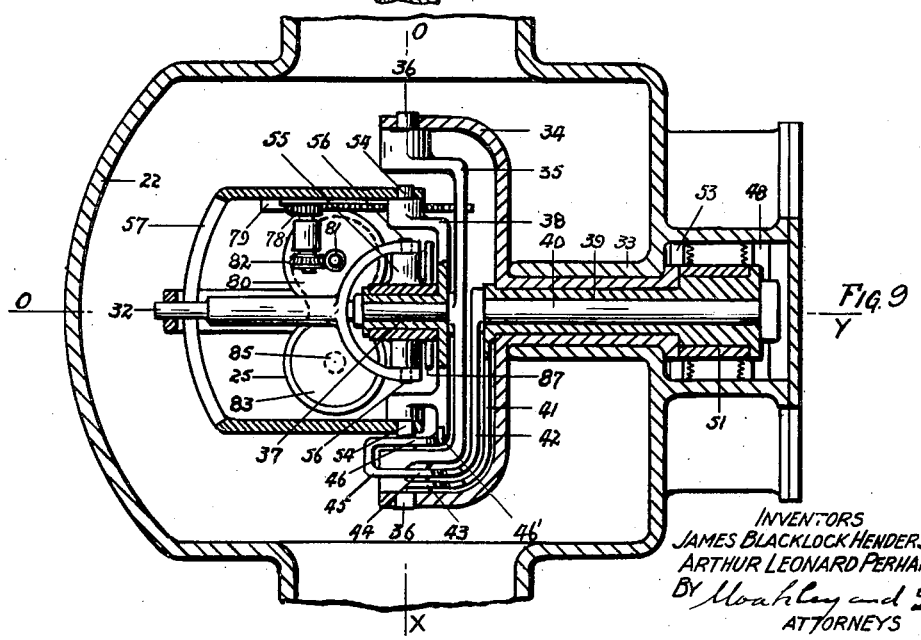

Fig. 27 illustrates on an enlarged scale in part section a portion of the double gimbal system shown in Fig. 9.

Figure 1:
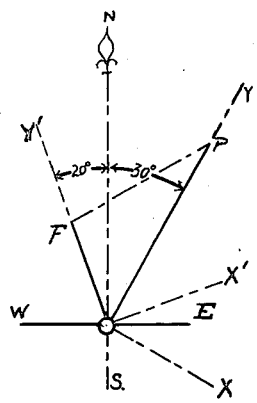

Fig. 1 represents a plan in the horizontal plane of the axes OX and OY of the present target position projected at P and the future target position projected at F, PF being the target traverse during the time of flight, these positions being shown in relation to O, the origin of the datum axes. The target being at a low elevation the axis OY is trained to coincide with OP, OX being at right angles to it. Neglecting for the moment other deflections which will be referred to later, the ideal gun axis O'Y' is deflected so as to coincide with OF. For purposes of explanation conventional compass directions are also shown, so that P may be defined by its polar coordinates OP and the azimuth angle NOP, say 30° east, and the future target position by its polar coordinate OF at an angle of 20° west. Alternatively, if more convenient, ON might be the fore-and-aft line of a ship or any other bearing of reference.

Figure 2:
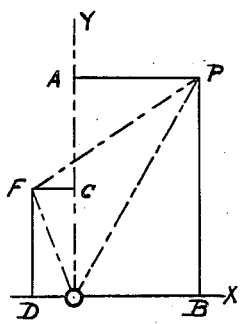
Fig. 2 is a corresponding plan diagram using cartesian coordinates at high elevations.
Figure 3:
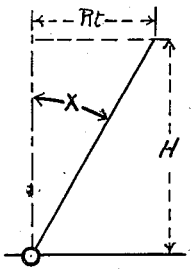
Fig. 3 shows diagrammatically the derivation of the $y$ coordinate of the target, or "range towards", from the target height H and the X angle.
Figure 4:
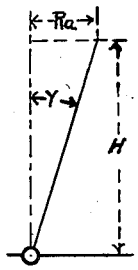
Fig. 4 shows similarly the derivation of the $x$ coordinate or "range across" from the height H and Y angle.

Figs. 2, 3 and 4 show our method of dealing with elevated targets. In Fig. 2 OX and OY are the datum axes of the sight defining a horizontal plane on to which the present position of the target is projected at P and the future or predicted position at F. To determine the position of P for purposes of predicting F, we determine the coordinates AP and BP and by means of them we set out the vector OP. To this we add the vector PF representing in direction and amount the target traverse in relation to the air during the time of flight of the shell, giving the resultant vector OF, which is then resolved into coordinates CF and DF.

If a plane is supposed to be pivoted on the axis OX of Fig. 2 and rotated from the vertical until it contains the actual target, the angle of rotation being X, then as shown in Fig. 3, the $y$ coordinate of the target, or the "range towards" (denoted by the symbol $Rt$ in Fig. 3, which corresponds to OA or PB of Fig. 2) is equal to H tan X, H being the target height.

Similarly if a plane is hinged on OY and tilted at an angle Y from the vertical so as to contain the target, then, as shown in Fig. 4, the "range across", or $Ra$ or the $x$ coordinate of the target position, i. e. OB of Fig. 2, is equal to H. tan Y.

By aligning the sights on the target we measure the angles X and Y, and from these measurements and independent observation of the target height we then deduce the rectangular $x$ and $y$ coordinates defining the target position relatively to the axes OX and OY.

With these preliminary explanations we shall now proceed to describe in detail an embodiment of our invention, referring first to the sighting unit and sight arm mechanism. For purposes of explanation we have selected a mechanism adapted to be fixed to the training platform of an anti-aircraft gun such as may be carried on a motor lorry or tank. We shall deal later with modifications necessary when the mechanism is fixed to a non-training platform or to the deck of a ship.

Figure 12:
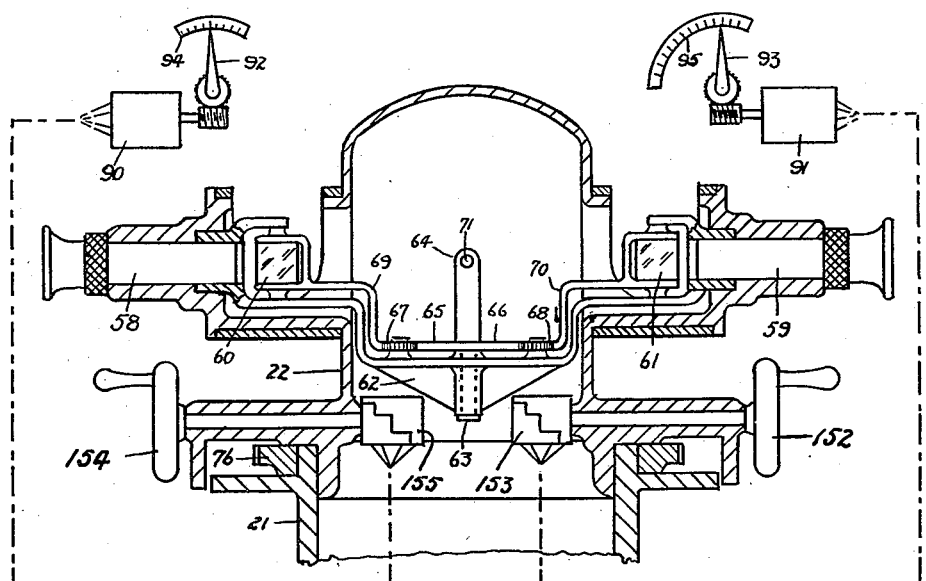
Figure 13:
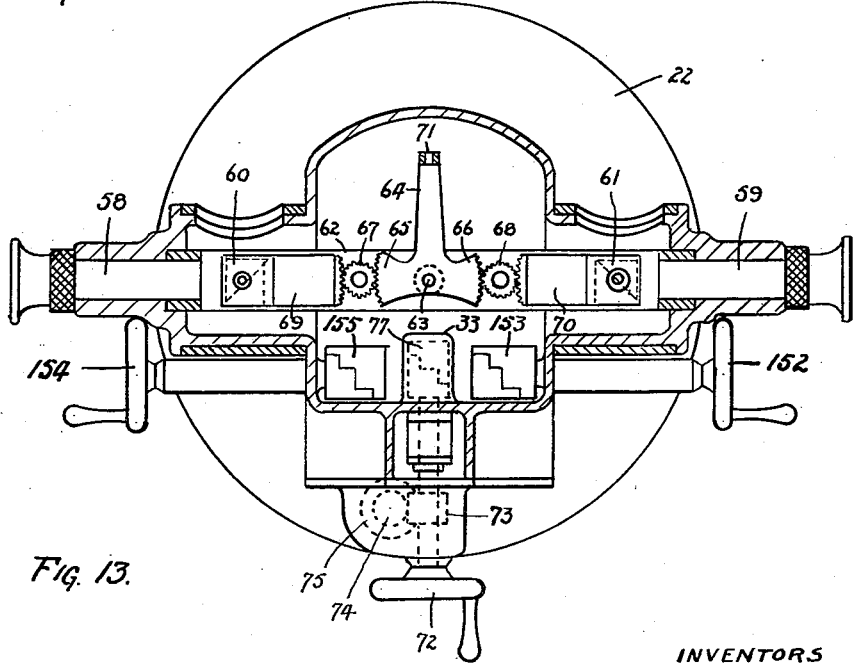

A pedestal 21, shown in Fig. 5, is rigidly bolted to the training turntable of the gun. At its upper end there is mounted a cowl or turntable 22 which can be trained around the central axis of the pedestal and which carries the sighting unit. The mechanism of the sight itself has been omitted from Fig. 5 and is shown separately in Figs. 12 and 13 which will be described later.

Figure 7:
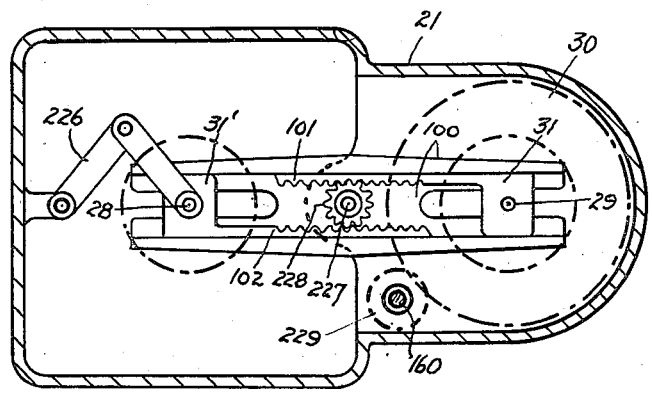
Figure 8:
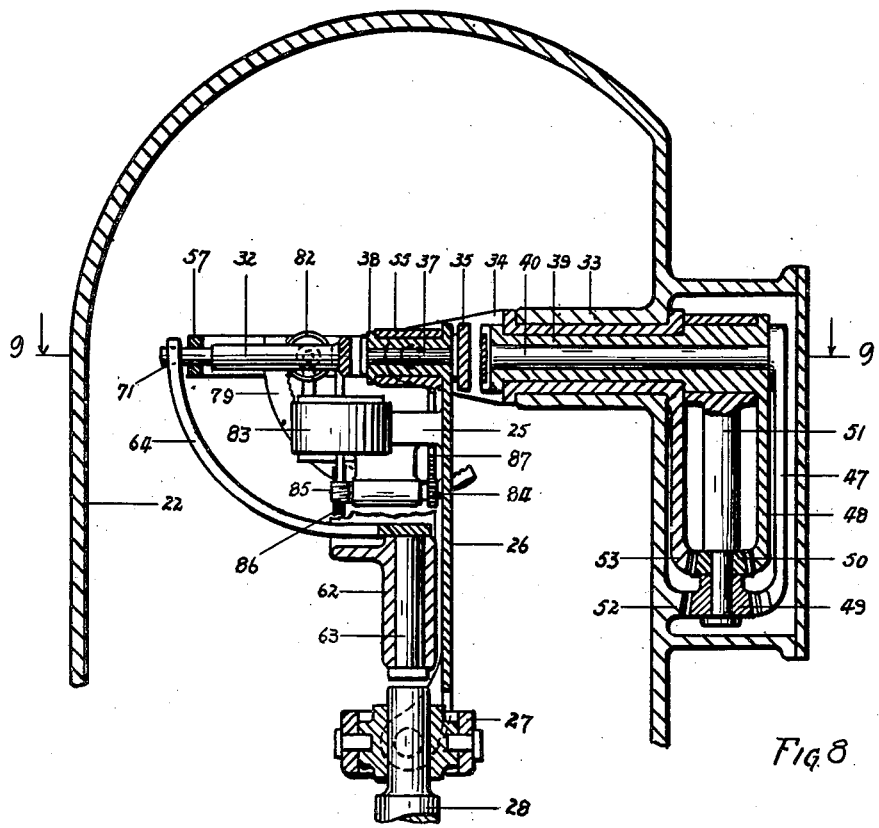

Suspended in the turntable 22 on a system of double gimbals, of which only the double differential gears 23 and 24 are seen in Fig. 5, is a small platform 25 which carries a down-coming arm 26 ending in a universal joint 27 which can slide on the turned end of a pin 28 normally coaxial with the central vertical axis of the pedestal 21. By means of an adjustable crank pin 29 on a crank disc 30 and a pantagraph 31 (seen in section in Fig. 5 and in plan in Fig. 7) we move the pin 28 parallel to itself within the pedestal so as to keep the platform 25 horizontal whenever the main pedestal 21 is tilted by any tilt of the gun platform. The platform 25 carries the sight arm 32 with its OX and OY trunnions as will now be described in greater detail with reference to Figs. 8, 9 and 27 which show enlarged views of the sight arm mechanism.

On the normally horizontal boss 33 on the turntable 22 there is pivoted a fork 34, in the arms of which there is pivoted a frame 35 on an axis 36, which is normally horizontal and intersects the central axis of the pedestal and the axis of fork 34. The frame 35 supports the horizontal trunnion 37 which is the OY trunnion of the sight arm. The forked frame 38, which is integral with the platform 25 and down-coming arm 26 already mentioned, is pivoted on the pin 37.

We require to level the frame 38 and platform 25 so as to eliminate therefrom the tilt of the main pedestal, and since it is known that any body suspended on a single gimbal ring is turned in azimuth when levelled relatively to a tilted support if the axis of tilt is inclined to both gimbal trunnions, this error being well-known as "gimbaling error", and since it is desirable to eliminate this error from our mechanism, we have introduced a new system of suspension on double gimbals, which annuls the velocity-ratio error of a single gimbal ring by introducing an equal and opposite error through a second gimbal ring. The requisites are two gimbal rings or similar universal joints connected in series between the support and the supported element, one ring pivoted on the support and the other on the supported element on axes which are normally parallel or coincident, and the outer trunnion of the inner gimbal ring and the inner trunnion of the outer ring being always parallel or coincident and interconnected by a cardan element which must be equally inclined to the axes of the support and supported element. This cardan element may be an intermediate trunnion axis common to both gimbal rings and lying in the plane bisecting the angle between the axes of the two main elements. In the particular example shown, 22 is the outer support and the frame 38 the supported element, the axes of both being normally coincident and vertical. The outer gimbal ring is the fork 34 pivoted on 22, and the inner gimbal ring is the fork 35 pivoted on 38 by the trunnion 37 normally coaxial with the axis of fork 34. To provide a unity velocity ratio between 22 and 38 so as to eliminate gimbaling error when frame 38 is levelled relatively to the tilting pedestal 22, the intermediate trunnion axis 36, which is common to both systems, must be constrained so as to lie always in the plane bisecting the angle of tilt of the pedestal 22 relatively to the levelled frame 38.

For this purpose the pivot trunnion of the fork 34 is made hollow to accommodate a hollow sleeve 39 and a spindle 40, these being fitted respectively with segments of bevel wheels 41 and 42 (Figs. 9 and 27) these segments engaging with corresponding bevel pinion segments 43 and 44. As is shown more fully in Fig. 27, 43 is secured to one of the trunnions of the frame 35, while 44 is mounted so as to turn freely on the same trunnion of the frame 35 and is joined by a yoke 45 to a bevel pinion segment 46 which engages with bevel teeth 46' on the levelled frame 38. The spindle 40 and sleeve 39 also carry at their other ends (Fig. 8) bevel segments 47 and 48 which mesh respectively with bevel pinions 49 and 50 pivoted on an arm 51 which is loosely pivoted on the sleeve 39. These pinions 49 and 50 also mesh with bevel segments 52 and 53 cut respectively on the turntable 22 and on a segment carried by the hollow trunnion of the fork 34. The effect of this method of coupling is that if the turntable 22 tilts relatively to the horizontal frame 38 about the trunnion 37, the forks 34 and 35 tilt together through half the tilt of the turntable, so that angular displacements of 38 relatively to 35, and of 34 relatively to 22 are always equal irrespective of the tilt of 35 relatively to 34 around 36, with the result that the frame 38 can always be levelled at any angle of tilt of the pedestal 21 and turntable 22 without disturbing the azimuth of the OY trunnion 37.

A further feature of this double gimbal system is that since the whole mechanism is connected to the turntable 22 for purposes of training by the trunnion of the fork 34, any training movement of the turntable must be communicated to the trunnion 37, with this distinction that while the trunnion 37 is always horizontal and the turntable may be tilted, the training movement of the latter, even when tilted, produces an exactly equal displacement of the trunnion 37 in azimuth.

The frame 38 is therefore a levelled member which is controlled in azimuth by training of the turntable 22. It controls the horizontality of the OY trunnion 37 and it is also furnished with a second set of horizontal trunnions to represent the axis OX, namely the trunnions 54 which are at right angles to the trunnion 37. By training the turntable, even when tilted, through any angle, the horizontal datum trunnions OX and OY, i. e. trunnions 54 and 37 are trained through the same angle in azimuth.

To represent the Y plane tilting round OY we pivot a cross-shaped member 55 on the frame 38 coaxially with the trunnion 37, and on this member we pivot the sight arm 32 on trunnions 56 normally coaxial with the OX trunnion 54. The sight arm 32 will therefore partake of any Y angle applied to the Y plane member 55 about the OY axis 37. Similarly to represent the X plane we pivot on the trunnions 54 a slotted frame 57, the slot in which engages a turned end on the sight arm 32. The sight arm will therefore partake of any X angle applied to the X plane member 57 about the OX axis 54. Or, to put it differently, if the sight arm is pointed at the target the members 57 and 55 will move respectively through the appropriate X and Y angles. What we have to do is to measure these angles, and for that purpose we must point the sight arm at the target. We shall now describe with reference to Figs. 12 and 13 how this is done.

As shown in these two figures the two sighting telescopes 58 and 59 are carried in cylindrical sleeves formed in the turntable 22 at right angles to the sight arm in its normal position, so as to look inwards at each other along the normal direction of the OX trunnion 54 of Fig. 9. Their lines of sight, however, are reflected by the prisms 60 and 61 which are mounted on small trunnions in a U-shaped frame 62, the U of which is occupied by the sight arm mechanism already referred to. A normally vertical sleeve-bearing in the frame 62 carries a pivot pin 63 on which is mounted an arm 64 of quadrant shape (better shown in Fig. 8) which has two small toothed sectors 65 and 66 which mesh with pinions 67 and 68 pivoted on pins in the frame 62. These pinions also mesh with toothed sectors carried by levers 69 and 70 to which the prisms are attached. The radius of the sectors 69 and 70 from their pivots is double the radius of the sectors 65 and 66 from their pivot axis 63, so that if the arm 64 is rotated about its pivot 63 the prisms will be rotated in the same direction but through half the angle about their own pivots, so that the line of sight of the telescopes will be deflected through the same angle and in the same direction as the arm 64. All these parts, except the telescopes, are mounted rotatably on the axis of the telescopes. As is seen more clearly in Fig. 8, the turned end on the sight arm 32 engages in a circular hole 71 in the curved arm 64, so that the position of the latter is controlled solely by the sight arm or vice versa. In the position shown in Fig. 12 the sight arm is horizontal and lying along the axis OY and the line of sight of the telescopes is parallel to the sight arm. If the sight arm is elevated about OX the arm 64, the frame 62 and the telescope prisms move with it and elevate the line of sight through the same angle; also if when elevated the sight arm is moved sideways round OY, its component rotation about the axis 63 is communicated equally to the line of sight. Thus the line of sight of the telescopes is kept constantly parallel to the sight arm, or by laying their sights on the target the operators must point the sight arm at the target.

Returning now to Fig. 5, the turntable 22 is trained relatively to the pedestal 21 by means of a handwheel 72, worm 73, wormwheel 74 and pinion 75, the last mentioned meshing with the sight training rack 76. The handwheel 72 also turns a transmitter 77. The rack 76 is not fixed to the pedestal 21 but is keyed to it by a pinion 150 (Fig. 14) on a shaft 160 which is driven off the training rack 151 of the gun turntable by a second pinion 161 and idler 162 so as to train equally with but oppositely to any training movement of the gun and pedestal 21. This effects that the turntable 22 and sighting unit can be trained relatively to the gun and pedestal 21 by means of the handwheel 72, but any change of training of the gun and pedestal will not disturb the azimuth of the line of sight.

As regards elevation, or X angle, the position of the sight arm is controlled by the member 57 which tilts round the OX trunnion axis 54. This movement is controlled by a pinion 78 (Fig. 9) which meshes with a quadrant rack 79 fixed to the member 57. The pinion may be directly controlled manually, but in view of the stabilization of the parts this is not very convenient and we prefer to provide the operator with a handle 152 (shown in Figs. 12 and 13) which merely drives a transmitter 153 by which a step-by-step motor 80 (Fig. 9) is controlled, the motor 80 driving the pinion 78 through the worm 81 and wormwheel 82, the motor 80 being carried on the stabilized platform 25. By similar means another handwheel 154 (Fig. 12) and transmitter 155 enable the operators to control a second step-by-step motor 83 on the platform 25, this motor driving a pinion 84 (Fig. 8) through the worm 85 and wormwheel 86. The pinion 84 meshes with a segmental rack on an arm 87 integral with the member 55 which tilts about the OY trunnion 37. A better view of the frame 38 with its associated motors is given in Fig. 19. As is shown diagrammatically in Fig. 12, the transmitters 153 and 155 also control two step-by-step motors 91 and 90 respectively at the predictor which actuate pointers 93 and 92 to indicate respectively on dials 95 and 94 the X and Y angles of the line of sight to the target.

To align their sights on the target, therefore, the operators turn their handwheels and, if necessary, the training handwheel 72 and the displacements which they thus apply to the motors 80 and 83 respectively, and to the pointers 93 and 92 at the predictor, are the X and Y angles of the line of sight appropriate to the particular azimuth of the OX and OY axes determined by their operation of the training handwheel 72. The training transmitter 77 is coupled electrically to a step-by-step motor at the predictor.

Having now seen how the sight operators determine and transmit to the predictor the azimuth of the OX and OY axes and the X and Y angles of the line of sight, reference may now be made to our copending patent application, Serial No. 500,402, filed Dec. 5, 1930, for a detailed description of the predictor and of the use which it makes of these supplied data. Seeing, however, that in the present invention we are not immediately concerned with the predictor but only with the determination of certain data to be supplied to it and with the utilization of certain other data determined by the predictor and transmitted by it to the conversion unit, it will be sufficient link between the explanation so far given and that which follows to state briefly that the transmitted output of the predictor is (1) the azimuthal difference between the coordinate axes OX and O'X' and (2) the X' and Y' angles, relatively to the axes O'X' and O'Y', of the predicted direction in which the gun must be pointed in order to hit the target under observation by the sight. We shall therefore proceed to a description of our conversion unit and shall explain how it applies these data to the settings of the ideal gun and derives therefrom other settings applicable to the actual gun.

Figure 6:
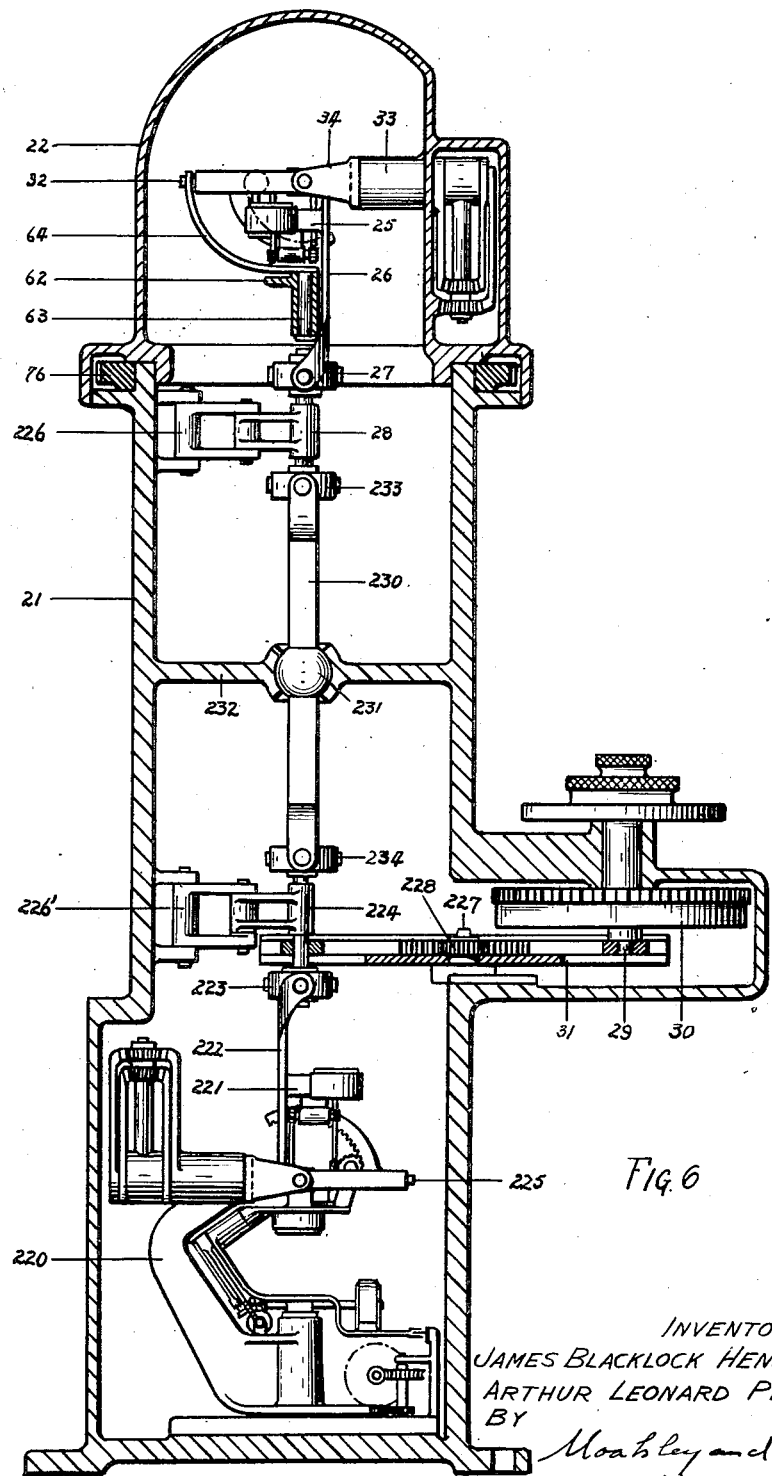

Referring first to Fig. 6 we see that the pedestal 21 contains in its lower part a mechanism having some resemblance to a gun mounting. The pedestal or turntable 220 carries on double gimbals, which need not meantime be described as they are practically identical with those of the sight arm already described a small platform 221 fitted with an upward-extending arm 222 terminating in a universal joint 223 which slides on the pin 224 by which it can be corrected for tilt of the main pedestal. This platform carries two trunnions representing the O'X' and O'Y' axes. On them are pivoted members representing the pivoted X' and Y' planes and by their movements the ideal gun 225 is controlled. The latter, it should be noted, is mounted so as to point in the direction representing the breech of the gun, i. e. an elevation of the gun so as to be directed at an elevated target to the left of the figure would entail a depression of the ideal gun 225 so as to point downwards to the right. This, however, is merely a matter of mechanical convenience.

In Fig. 5 we have practically the same mechanism with the difference that the ideal gun has been trained through 180°. This is the preferred form and as the difference is due to a particular method of applying the tilt correction it may be more convenient to explain this correction first.

In Fig. 5 the pin 28 is normally in the centre of the pedestal 21 and is supported from it by a member 226 hinged at one side to the pedestal and at the other to two arms on the pin 28, both hinge-pins and the pin 28 being parallel to the central axis of pedestal 21, so that the pin 28 can swing about within the pedestal always remaining parallel to the axis of the pedestal. The pedestal also carries a rotatable crank disc 30 provided with a radially and angularly adjustable crank pin 29 which is connected to the pin 28 by a pantagraph more clearly shown in Fig. 7 which shows a section of the pedestal on the line 7—7 of Fig. 5. The pantagraph consists of a double armed lever 100 pivoted at its centre on a pin 227 fixed to the pedestal 21 midway between the centres of the pedestal and the disc 30. In the arms of the lever 100 slide two blocks 31 and 31' respectively, carrying opposed racks 101 and 102 which mesh with a pinion 228 pivoted on pin 227 so that the racks can only slide equally and oppositely along the lever, while the whole pantagraph can pivot on the pin 227. The pin 29 engages in a hole in block 31, and pin 28 in a hole in block 31', with the result that if the crank pin 29 is set to a radius on its disc, the pin 28 will be equally and oppositely displaced from the centre of the pedestal 21, and if the crank pin is then moved round the circumference of a circle, the pin 28 will move in the same sense round a circle of the same radius but with a constant phase difference of 180°. If therefore, the pedestal 21 is tilted in any direction from the vertical, and if the crank pin is moved "uphill" to a radius having a certain relation to the sine of the angle of tilt, the pin 28 will be moved by an equal amount "downhill" and if the proportional movement of the crank pin has been correctly arranged, the sight arm platform 25, which is controlled by the pin 28 through the downcoming arm 26 (Fig. 5) will be truly levelled. The required proportion is obviously governed by the length of the arm 26, so that the displacement of the pin 28, or the radius of the crank pin 29, divided by the fixed length of the arm 26 must be arranged to be equal to the sine of the angle of tilt. To avoid the necessity for altering this correction at every change in the angle of training of the pedestal 21 or sight turntable 22, we provide the crank disc 30 with a circular rack which meshes with a pinion 229 shown in Fig. 14, which is mounted on the shaft 160 already referred to so as to train the crank disc 30 equally and oppositely to any training movement of the pedestal or gun. This elimination of gun training from the crank disc 30 ensures that once the tilt correction is set on the disc it need not be altered for any change in the training of the pedestal, unless the tilt of the training axis has altered.

Now if the pin 28 in Fig. 5 is moved as above described so as to level the sight arm platform 25, the ideal gun platform 221 will not be levelled, but will become tilted from the vertical at double the tilt of the pedestal. If we wish to level both platforms, we may use the alternative mechanism shown in Fig. 6 in which the downcoming arm 26 of platform 25 and upgoing arm 222 of platform 221 are connected to separate pins 28 and 224, both of which are hinged to the pedestal on separate double-hinged mechanisms 226 and 226', the two pins being linked together for opposite movement within the pedestal by the rocking lever 230 carried at its centre by a ball joint 231 in a diaphragm 232 of the main pedestal and connected to the pins 28 and 224 by sliding universal joints 233 and 234. A single tilt correction applied as before by the crank pin 29 and pantagraph 31 will then serve to level both platforms 25 and 221 simultaneously.

Suppose now that the pedestal 21 of Fig. 6 is tilted over to the right in the drawings and that the tilt correction is applied to level both platforms. The arm 222 of the platform 221 being now vertical, will be tilted to the left relatively to the pedestal axis. Now imagine that the ideal gun arm 225 is set on its gimbals so as to point at the gun axis position, and then without disturbing the ideal gun, the arm 222 is freed from the pin 224, and the turntable 220, together with the ideal gun 225 and the arm 222, is trained round the central axis of the pedestal through 180°. This movement will not have altered in any way the setting of the ideal gun relatively to its mounting, but it will have brought the arm 222 into the exact position which, in similar conditions of tilt, would be occupied by the pin 28 of Fig. 5. The mechanism of Fig. 5 therefore represents a simple artifice which we prefer to use to simplify the apparatus whereby in levelling the upper platform 25, the pin 28 tilts the lower platform 221 from the vertical through double the angle of tilt of the pedestal, and we assure that this movement will not affect the setting of the ideal gun by keeping it permanently trained through 180° from the direction which it would have to occupy if the platform 221 were truly levelled and if the ideal gun were actually pointed at the gun axis position.

Although we have heretofore referred to the ideal gun as being pointed at the gun axis position, and shall continue so to refer to it, it will be understood that in the preferred form of pedestal shown in Fig. 5 this is not true. In that mechanism the ideal gun is displaced relatively to its gimbals through the same angles as would be applied in order to point it at the gun axis position if the platform 222 were actually levelled and trained through 180°. In the rest of the specification we shall refer only to the Fig. 5 embodiment, in which the sight arm is pointing at a target on the horizon towards the left of the figure and the ideal gun 225 towards the breech of a gun trained through 180° relatively to the gun axis position, and in which an elevated target entails elevation of the sight arm and a depression of the ideal gun 225.

Figure 10:
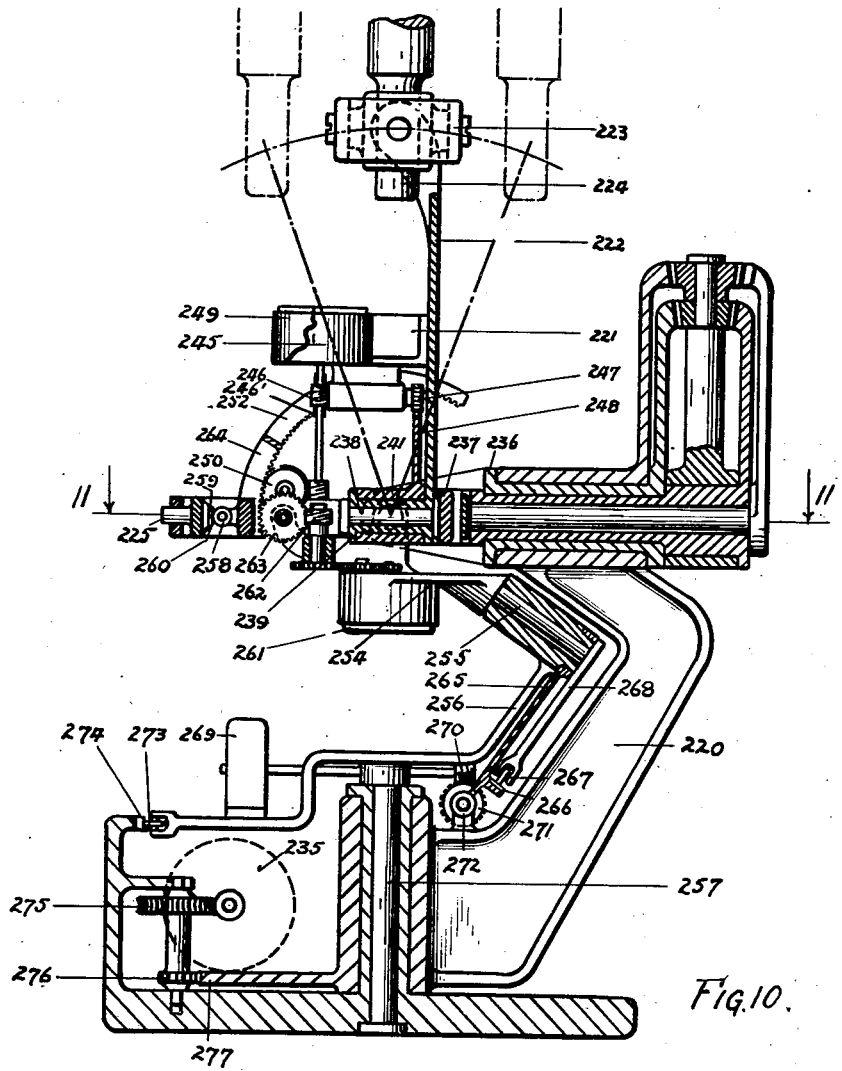
Figure 11:
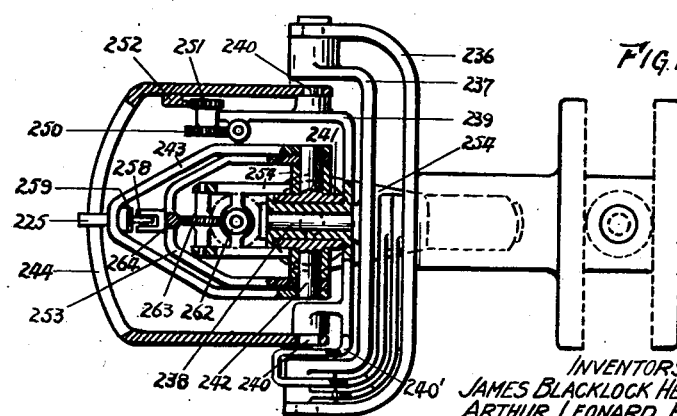

For a fuller description of the ideal gun mechanism we shall now refer to Figs. 10 and 11, Fig. 10 being an enlarged view of the mechanism seen at the foot of the pedestal in Fig. 5, and Fig. 11 being a sectional plan of the same mechanism sectioned on the line 11—11 of Fig. 10.

The turntable 220 is mounted with training freedom within the main pedestal 21, to which, however, it is constrained by the motor 235 and its associated gearing. The turntable provides a normally horizontal bearing for a system of double gimbals similar to that already described in the case of the sight arm. The outer gimbal of the system is the fork 236 which supports on trunnions at right angles to its own pivot an inner fork 237 which carries the O'Y' trunnion 238 normally coaxial with the trunnion of fork 236. On the trunnion 238 is pivoted the frame 239 which is integral with platform 221 and arm 222 through which the tilt correction or compensation is applied. The frame 239 is extended sideways in a fork which carries the O'X' trunnions 242. On the O'Y' trunnion 238 is pivoted the cross-shaped member 241 which represents the Y' plane and on its cross trunnions 242 is pivoted a member 243 which terminates in a turned pin from which is the ideal gun 225. The ideal gun engages in a slot in the U-shaped frame 244 which is pivoted on the O'X' trunnions 240 and represents the X' plane. The position of the ideal gun 225 is therefore determined by the tilt of the X' plane member 244 about the O'X' axis 240 and by the tilt of the Y' plane member 241 about the O'Y' trunnion 238. These tilting movements are controlled as follows.

The upward-extending arm 222 of the frame 239 carries a small motor 245 (Fig. 10) which is controlled by a transmitter at the predictor from which it receives a displacement proportional to the angle Y' determined by the predictor. This movement is conveyed to the Y' plane member 241 by the motor 245 which drives a worm 246 and wormwheel 246', the latter being on the same spindle as a pinion 247 which meshes with a quadrant 248 carried by the Y' plane member 241, these parts being better seen in Fig. 20 which is an elevation of the frame 239 and its associated motors seen from the left hand side of Fig. 10. Similarly another transmitter at the predictor transmits the X' angle to the motor 249 (Figs. 10 and 20) carried by the platform 221, which drives the wormwheel 250 on the same spindle as a spur pinion 251 which meshes with the elevating rack 252 on the X' plane member 244. The ideal gun 225 is therefore pointed at the gun axis position, but since the settings of the ideal gun are applied relatively to the levelled frame 239 they are inapplicable as setting of an actual gun relatively to the unlevelled training platform on which it is mounted. Since the pedestal 21 is carried on the same platform as the actual gun, what we now have to discover are the displacements of the ideal gun relatively to the pedestal about trunnions parallel to those of an actual gun. For this purpose we mount concentrically with the ideal gun a "dummy gun" 253 on a miniature gun mounting in exact replica of that of the actual gun, its trunnion axes being parallel to those of the actual gun. In the present drawings we have adopted for purposes of illustration a gun mounting of the type described in co-pending patent application Serial No. 167,833, but any other type of anti-aircraft gun mounting could be used with equal facility so long as it is of exactly the same type as the actual gun with which the mechanism is intended to be associated.

Our dummy gun 253 is mounted on an elevating axis 242 on the Y' plane member 241 coaxially with the ideal gun. This, as already explained, is to limit the number of possible settings of a free gimbal mounting to only one solution for each position of the ideal gun. The dummy gun cradle 254 is also pivoted on this same axis 242 and is also carried on an inclined cross-tilting or cross-levelling trunnion 255 (Fig. 10) in a dummy training pedestal 256 which is free to turn in training around the training axis 257 of the ideal gun turntable 220, i. e. around the central axis of the pedestal 21. What we have now to determine are (a) the elevational displacement of the dummy gun 253 about its trunnions 242; (b) the cross-tilting displacement of the dummy gun cradle 254 about the inclined trunnion 255 due either to levelling of the frame 239 or application of an angle Y' to the ideal gun, and (3) the training displacement, if any, of the dummy gun pedestal 256 about its training axis 257 required to align the dummy gun with the direction of the ideal gun.

First as regards elevation, a contact trolley 258 carried by the dummy gun 253 coacts with twin contacts 259 and 260 on the ideal gun 225 so as to drive a D. C. reversible motor 261 (Fig. 10) in one direction or the other, the motor being carried on the dummy gun cradle 254 and driving through suitable gearing a worm 262 which meshes with a worm wheel 263, the latter acting also as a spur wheel in engagement with the dummy gun elevating rack 264. The contacts 258, 259 and 260 therefore keep the dummy gun axis elevated relatively to its cradle so as to be aligned with the ideal gun and this movement of the dummy gun is transmitted to the elevation pointer at the actual gun by a transmitter (not shown) driven by motor 261. In Fig. 10 the ideal gun and dummy gun elevation racks 252 and 264 are exactly behind each other, and 264 is shown cut away to disclose part of 252. As is shown in Fig. 20 the tail end of rack 264 passes through a hole 264' in the frame 239.

When the main pedestal 21 and the actual gun are tilted and the corresponding tilt correction or composition is applied to the frame 239 and the ideal gun, or, apart from tilt, when a Y' angle is applied to the ideal gun, the dummy gun cradle 254 must move with the trunnion 242 about the O'Y' trunnion 238. This movement of the dummy gun cradle causes it to rotate, relatively to the dummy gun mounting, about the inclined trunnion 255 (Fig. 10), and since 255 is inclined to the axis round which the cradle is tilted by the tilt correction or Y' angle there must also be a simultaneous movement of the trunnion 255 and dummy gun pedestal 256 in training round the training axis 257 to make the movement of the cradle possible. This training movement of the dummy gun pedestal is not confined to pedestals using an inclined cross levelling axis such as we have described, but will be found in any gimballed gun mounting when a tilt, tilt correction, or cross angle is applied about an axis not coincident with the corresponding trunnion axis of the gun. The displacement of the dummy gun cradle 254 about the inclined trunnion 255 and its training displacement about the trunnion 257 must now be conveyed to the actual gun. On the dummy gun pedestal 256 coaxially with the inclined trunnion 255 we mount a follower arm 265 which carries a two-part commutator 266 coacting with a contact roller 267 on the end of an arm 268 keyed to the end of the trunnion 255 of the dummy gun cradle. The contacts 266 and 267 control a D. C. reversible motor 269 on the dummy gun pedestal 256 and this motor is connected by a worm 270, wormwheel 271 and worm 272 to a worm sector on the follower arm 265 so that the latter is driven to follow the tilt of the arm 268 and the gun cradle 254 about the inclined trunnion 255, this movement being transmitted to the crosswise adjustment pointer at the actual gun by a transmitter (not shown) driven by the motor 269.

Similarly the training displacement of the dummy gun pedestal 256 operates a switch consisting of the roller 273 carried by the dummy gun pedestal and a two-part commutator 274 mounted on the main pedestal. These contacts control a D. C. reversible motor 235 mounted on the pedestal 21, a worm on the spindle of the motor driving a wormwheel 275 and spur pinion 276, the latter meshing with a spur rack 277 on the ideal gun pedestal 220. The motor 235 also drives a transmitter (not shown) by which this training movement is transmitted to a step-by-step motor in the predictor where, as is explained in above-mentioned copending application Ser. No. 500,402, filed December 5, 1930, the displacement is added to the other required training movements and finally transmitted to the gun training pointer by reference to which the gun and pedestal 21 are trained.

The action during this training correction modifies to a slight extent the statement which we have made that we keep the ideal gun and dummy gun pointed at the gun axis position. In their normal positions the various trunnion axes of the dummy gun are parallel to the corresponding trunnions of the actual gun and, apart from the training correction which we are now discussing, the ideal gun pedestal 220 trains only with the actual gun since the pedestal 21 and the actual gun are mounted on the same training platform. The training displacement of the dummy gun pedestal 256, therefore, throws the dummy gun pedestal out of line with that of the actual gun, but leaves the ideal gun pedestal 220 and the pedestal 21 in the same training as the actual gun. Both the ideal and dummy guns, however, are pointed at the gun axis position and the elevational and crosswise adjustments of the dummy gun, if applied to the actual gun, cannot align it with the gun axis position unless it is displaced in training similarly to the dummy gun. If the training displacement of the dummy gun were simply transmitted to the actual gun by means of a follower arm, as in the case of the crosswise adjustment above described, the subsequent training movement of the actual gun would train both the ideal and dummy guns away from the gun axis position and the resulting readjustment or variation of the tilt correction would modify the cross adjustment of the actual gun so that it also would be deflected from the gun axis position. The mechanism which we have described, however, avoids this by using the motor 235 to deflect both the ideal and dummy guns momentarily from the gun axis position by the amount of the training displacement through which the dummy gun pedestal was initially deflected in training by the cross adjustment about trunnion 255, this movement restoring the trunnions of the dummy gun into parallelism with those of the actual gun. The transmission of the same movement to the actual gun via the predictor then produces in the actual gun, when its pointers have been lined up, an equal training movement in the opposite direction which also acts on the dummy and ideal guns, so that they are restored to the required position in which they, as well as the actual gun, are pointed at the gun axis position correctly with the pivotal axes of the dummy gun parallel to the corresponding trunnions of the actual gun.

We have described the motors 235, 261 and 269 as being of the reversible D. C. type driving transmitters by which other motors of step-by-step type are controlled elsewhere. We may, however, arrange that the several switches shown control D. C. motors mounted separately, these motors driving transmitters by which the motors 235, 261 and 269, in that case of the step-by-step type, may be controlled in synchronism with other step-by-step motors wherever required.

Figure 17:
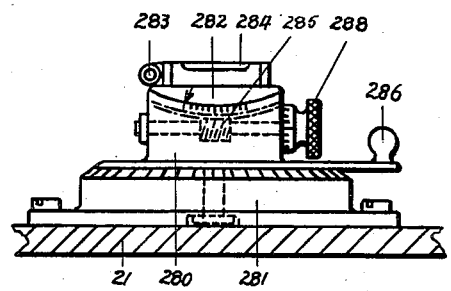

For purposes of setting the tilt correction on the crank pin 29 of Fig. 5 we use a clinometer which indicates both the direction and amount of tilt. This is shown in Fig. 17, It consists of a small turntable 280 free to turn relatively to a baseplate 281 round an axis at right angles to the gun turntable, the plate 281 being rigidly attached in any convenient place either to the pedestal 21 or gun turntable. The turntable 280 is formed with circular guides to accommodate a frame 282 on which are mounted two spirit levels 283 and 284 at right angles to each other. A worm 285 journalled in the turntable and turned by a knob 288 engages with a worm sector in the frame 282. A handle 286 is attached to the turntable 280 for swinging it round relatively to the baseplate 281. To determine the direction of tilt the turntable 280 is rotated by handle 286 until the bubble in level 283 is at zero, when a pointer on the turntable reading against a scale of degrees on the base 281 gives the direction of tilt relatively to the base 281 or pedestal 21. Similarly a pointer on the frame 282 reads against a scale of degrees on the turntable 280 and by turning the knob 288 until the bubble in level 284 is at zero the angle of tilt can be read off this scale. Suitable scales for radius and phase are provided to set the crank pin 29 (Fig. 5) relatively to the crank disc 30 by means of knobs 289 and 290 in accordance with the tilt readings of the clinometer, the scale for radius being proportional to the sine of the angle of tilt and not equally divided, or the scale could be equally divided and the crank pin set by a sine cam mechanism.

In Fig. 18 we show an alternative mechanism which is incorporated in the crank disc in a manner which makes it unnecessary to read off angles or directions of tilt. A disc 291 is pivoted on the pedestal 21 integrally with the toothed crank disc 30 by a hollow spindle, the crank disc 30 being coupled, as before, to the training gear of the gun turntable so as to train equally and oppositely to the gun and pedestal 21. In their hollow spindle a frame 292 is journalled, the lower end of this frame being formed in diametral guides in which a block 293 carrying the crank pin 29 can slide. Rack teeth are cut in the block to gear with a pinion 294 carried by a spindle 295 at the upper end of which is a gear wheel 296. A screwed spindle 297 having a milled head 298 is journalled vertically in the frame 292 and carries a pinion 299 gearing with wheel 296. On spindle 297 a sliding block 300 is threaded, slotted to engage with pins formed in a frame 301 which carries two levels 302 and 303 at right angles to each other, the level 303 being parallel to the diametral guides of the crank pin block 292, although for purposes of clearer illustration in a single figure we have shown the guides parallel to level 302. In use the frame 292 is adjusted relatively to the disc 291 until level 302 is at zero, this setting the correct phase of the guides. Then knob 298 is turned until the level 303 is at zero. This operation sets the crank pin 29 in radius proportional to the sine of the angle of tilt of pedestal 21 relatively to the level 303.

As regards phase setting of the crank pin 29 comparison of Figs. 5 and 6 will show that if the mechanism of Fig. 5 is used the correct phase setting of the crank pin is at 180° to the direction of tilt, i.e. the pin must be set "uphill" in order to set the pin 28 "downhill," so as to level the platform 25, whereas in Fig. 6 the crank pin 29 must be set in correct phase with the tilt of the pedestal.

In Figs. 21, 22, 23 and 24 we show an alternative method of eliminating gimballing error from the OX, OY, O'X' and O'Y' trunnions, which has the merit of simplicity and cheaper manufacture as compared with the geared double gimbals shown in Figs. 8 to 11. It will be remembered that we explained earlier that the underlying principle of double gimbal suspension was the use of two gimbal rings or universal joints connected in series between the support and the suspended element, one ring pivoted on the support and the other on the supported element on axes normally parallel or coincident, and the other gimbal trunnions being interconnected and kept permanently parallel by a cardan member equally inclined to the axes of the support and supported elements, the type already described being a particular case in which the two gimbal rings are concentric and the cardan element is an intermediate trunnion common to both rings. In the system which we shall now describe the two gimbal rings are not concentric and a special type of cardan member is employed which is mechanically equivalent to a cardan shaft equally inclined to the axes of the two elements without exterior control. Figs. 21 and 22 show the application of this alternative system to the sight arm, and Figs. 23 and 24 its application to the ideal gun.

In Figs. 21 and 22 the fork 34 is trunnioned as before in the boss 33 of the sighting turntable 22 and supports the gimbal ring or fork 35 on the normally horizontal trunnions 34' all the intermediate gearing previously shown being done away with. The member 38 which carries the platform 25 and the downcoming arm 26 is trunnioned in the fork 35 on the vertical trunnion 310 normally coaxial with the central axis of the pedestal, and the OY trunnion 37 is directly mounted on it instead of on the fork 35. To eliminate gimballing error from the OY trunnion 37 when it is levelled to eliminate the effects of tilt of the pedestal we connect the frame 38 to the turntable 22 by a double gimbal linkage. The first gimbal or universal joint is the cross 311 mounted on the turntable 22 on a normally horizontal axis 312 and carrying the cross-trunnions 313. The second gimbal ring is the fork 314 mounted on the horizontal trunnion 315 carried by the downcoming arm 26 and carrying trunnions 316 parallel to the upper trunnions 313. With the parts in the normal positions P, O and Q which are the gimbal centres respectively of the upper gimbal 311, the frame 38 and the lower gimbal 314 all lie on the central axis of the pedestal and P and Q are equidistant from O. The trunnions 313 and 316 are linked together and kept permanently parallel by a cardan member consisting of the fork 317 trunnioned on the trunnions 313 and the fork 318 pivoted on the lower trunnions 316, the two forks being hinged together by the hinge pin 319. In Fig. 21 we have shown in dotted lines the arm 26 tilted to a position 26' and if the drawing is tilted over to the right to bring 26' vertical it will then illustrate the position of the parts when the pedestal is tilted to the right through the angle QOR and the frame 38 and arm 26 have been levelled by moving the levelling pin 28 to the right to the dotted position 28'. In these conditions Q has moved to R, the trunnion 310 has moved to 310' and the OY trunnion 37 has also been levelled into a new position (not shown) at right angles to 310' and passing through O around which all the movements have taken place. The links 317 and 318 have also moved into the new dotted positions where they are mechanically equivalent to a stiff cardan shaft of length PR, their normal equivalent being a stiff cardan shaft of length PQ. Since OP=OQ=OR, the angle OPR=the angle OPP, which means that the linkage is equivalent to a cardan shaft pivoted on the parallel trunnions of the two gimbal rings 311 and 314 and equally inclined to OP the axis of the pedestal 21 and OR the axis of the trunnion 310' on which the frame 38 is supported. There will therefore be no gimballing error in the frame 38 when the pedestal tilts and the frame is levelled. In case it might be thought from the position of the parts 314 and 316 in the drawings that there is a mechanical connection between them and the sight bracket 62 and trunnion 63, we have shown the latter elements in dotted lines 62' and 63' elevated to their extreme while the parts 314 and 316 are swung independently in the opposite direction. The dotted lines 62', 63' illustrate in a manner not previously shown an elevation of the line of sight about the OX trunnions to a position beyond the zenith. In Fig. 22, which is a plan view of the mechanism of Fig. 21 sectioned on the line 22—22, we have omitted the double gimbal linkage as the figure is merely intended to show the simpler gimbal suspension of the sight arm mechanism. The actual mechanism of the sight and sight arm is exactly the same as in Figs. 8 and 9.

Similarly in the case of the O'X' and O'Y' axes of the ideal gun the double gimbals and their associated gearing of Figs. 10 and 11 are eliminated and as shown in Figs. 23 and 24 a double gimballed linkage is used to connect the levelled frame 239 to the ideal gun pedestal 220 which tilts with the main pedestal 21. The fork 236 as before is trunnioned directly in the ideal gun pedestal 220 and supports the fork 237 which provides a vertical bearing for a trunnion 320 to which are attached the frame 239, arm 222, platform 221 and O'Y' trunnion 238, also the O'X' trunnions 240. To eliminate gimballing error from these datum axes a fork 321 is pivoted on a horizontal trunnion 322 on the arm 222, the fork carrying cross trunnions 323. To the ideal gun pedestal 220 is pivoted a frame or gimbal ring 324 on trunnions 325 normally parallel with the trunnion 322, and this frame carries cross trunnions 326 which are kept permanently parallel to the upper trunnions 323 by the hinged links 327 and 328, hinged together by the pin 329. The gimbal centres of the members 321 and 324 are normally on the central axis of the pedestal 21, and are also equidistant from the gimbal centre of the frame 239 so that when the main pedestal is tilted and the tilt correction is applied to the frame 239 by the pin 224, there will be no movement in azimuth of the O'X' and O'Y' trunnions carried by the frame 239.

In the above description we have referred to the pedestal 21 as being fixed to the training platform of the actual gun, but on ships where the guns are generally mounted on training platforms or turrets it would be more convenient to have the pedestal rigidly attached to the deck. In that case, as the pedestal would not train with the guns there is no need to have the reverse training control of the sight training rack 76 (Fig. 5). If this is eliminated by fixing the rack to the pedestal 21, the sight training transmitter will give the azimuth of the OY axis relatively to the ship. But since it would be advisable to eliminate from the sight the effects of yawing and turning of the ship, the rack 76 might instead be left loose from the pedestal and be controlled by a repeater motor 163 (Fig. 14) controlled by the ship's gyro compass, in which case the transmitter 77 would transmit to the predictor the compass azimuth of the OY axis. In Fig. 14 the motor 163 is shown in dotted lines to signify that it is an alternative to the training shaft 160, as both could not be used at the same time. In view of the double gimbal suspension of the sight arm these training movements transmitted from the turntable, though measured in the deck plane, are equal to the movements in azimuth of the OY axis. The ideal gun pedestal 220 would also have to be trainable relatively to the pedestal 21 so as to be capable of being aligned with the gun axis position, and this training would preferably be applied not directly to the turntable 220 (Fig. 10) but to its bedplate 220', which would then represent a miniature gun turret, and the motor 235 would then be mounted on the bedplate 220' instead of on the pedestal 21. This method of training the pedestal 220 by means of a motor 135, pinion 136 and rack 137 is shown in connection with an alternative type of pedestal in Fig. 15.

On board ship also the type of tilt correction mechanism which we have illustrated and explained above would not be very suitable for the ever-changing tilt of the ship's deck, and a gyroscopic control would be better. The double gimbal system shown in Figs. 8 and 9 lends itself readily to such control and we have shown in Figs. 25 and 26 an application of gyroscopic control of the levelled frame 38 which carries the sight arm, applied through the gearing of the double gimbal system. Fig. 25 shows a part sectional elevation of the mechanism and Fig. 26 is an enlarged plan of the gyroscope.

In Fig. 25 we have omitted all the sight arm mechanism not directly concerned with the tilt correction. To the arm 26 of the levelled frame 38 we attach a fork 330 bearing two trunnions 331 parallel to the OX trunnions of the sight arm and on these we pivot a gimbal ring 332 whose inner trunnions 333 are normally parallel to the OY trunnion 37. The trunnions 333 support a small gyroscope 334 controlled in any suitable manner so as to keep its rotor axis vertical. On the gyro we mount a contact roller 335 coacting with a two-part commutator 336 on the gimbal ring in line with the trunnions 331 and on the gimbal ring 332 we mount a similar trolley 337 coacting with a two-part commutator 338 on the arm 26. To keep the OX and OY trunnions horizontal we must keep the arm 26 parallel to the vertical rotor axis of the gyroscope. For this purpose we mount on the turntable 22 a D. C. reversible motor 339 which we control by means of the contacts 335, 336. The motor drives through suitable reduction gearing a pinion 340 meshing with a segmental rack 341 on the trunnion of fork 34 so as to drive 34 relatively to 22. Similarly a motor 342, carried on the epicyclic portion 51 of the double differential gears of the double gimbal system, is controlled by the contacts 337, 338 and drives, through suitable gearing, a pinion 343 which meshes with the same rack 341 so as to drive the epicyclic member 51 relatively to the fork 34.

If the pedestal 21 tilts round the gyro trunnion axis 333, motor 339 is excited and motor 342 is not. The segment 53 is therefore displaced relatively to turntable 22 and takes the epicyclic member 51 with it, since they are keyed together by the inactive motor 342. The pinion 50 therefore will not rotate so that sector 48 will also swing with 53, but the pinion 49 will roll on the fixed rack 52 and will drive the sector 47 at twice the speed of 53 and 48. The rotation of the sector 47 is communicated to the frame 38 by the toothed sector 42 and yoke 45 (Fig. 9) so that the frame 38 is restored to the vertical with the trunnion axis 36 of the fork 35 bisecting the angle of tilt between the frame 38 and the pedestal 21 since the fork 35 is driven by motor 339 at only half the speed of the frame 38. Similarly if the tilt takes place about the gyro trunnion 331, the motor 339 is inactive and keeps fork 34 and its sector 53 fixed relatively to the turntable 22, while the motor 342, being actuated by the gyro contacts 337 and 338, drives the epicyclic member 51 relatively to both racks 53 and 52, the pinions 49 and 50 being caused to rotate and drive the sectors 47 and 48 equally. These motions are conveyed through the segments 41 and 42 (Fig. 9) to the fork 35 and frame 38 about their supporting trunnions 36 so that the OY trunnion 37 is correctly levelled. These two controls are quite independent and neither of them interferes with the simultaneous action of the other, so that in any tilt of the pedestal 21 and turntable 22, the frame 38 with its OX and OY trunnions will be kept correctly levelled and the intermediate trunnion 36 of the double gimbal system will always lie in the plane bisecting the angle of tilt of the pedestal from the vertical so that gimballing error will be eliminated from the datum trunnions.

As the downcoming arm 26 is connected to the ideal gun datum trunnions O'X' and O'Y' through the pin 28, this gyroscopic control of the sight arm trunnions OX and OY will also level the O'X' and O'Y' trunnions without requiring the crank pin 29 and pantagraph 31 of Fig. 5. These can therefore be removed, and to decrease friction as far as possible it would be preferable to suspend the ideal gun on the alternative gimbal system shown in Fig. 23 rather than the geared arrangement of Fig. 10, Although in the foregoing description we have described the dummy gun as being constrained to the ideal gun along its barrel axis and also along its elevation trunnions, this second constraint, as has been explained, is only used with the object of limiting to one the large number of possible positions which the dummy gun gimbals could take up relatively to each other in aligning the dummy gun with the ideal gun. The result of this constraint, as has been seen, is to produce a training displacement of the dummy gun which has to be conveyed to the actual gun as a training correction in addition to the training angle determined by the predictor. It is not essential, however, to constrain the elevating trunnions of the dummy gun as the same effect could be produced by constraining any one of its other pivotal axes. In the particular type of gun mounting illustrated, in which the cross-levelling axis is substantially inclined to the horizontal, it is not possible to constrain it to the horizontal cross-levelling or cross-tilting trunnions of the ideal gun, i. e. the inclined trunnion 255 of the dummy gun cannot conveniently be constrained to the horizontal O'Y' trunnion 238 of the ideal gun. If, however, a gimballed gun were used in which the crosswise adjustment is applied about an axis which can be kept horizontal, such a constraint would be possible but as it would produce displacements both in elevation and in training it would only complicate affairs. A more practical alternative is to constrain the training of the dummy gun to that of the ideal gun. Such a construction is shown in Figs. 15 and 16, Fig. 16 being a plan of the ideal and dummy gun gimbals to show their separate elevation trunnions and the elevation follow-up gear of the dummy gun. In this form a single turntable 220 houses both the gimbal 236 of the ideal gun and the cross-tilt trunnion 255 of the dummy gun so that both guns train together. The suspension of the ideal gun 225 is the same as before, but the dummy gun is now provided with separate elevation trunnions 254' on the gun "cradle" 254. The ideal gun now takes the form of a sleeve 253" in which the ideal gun 225 fits loosely but without play, so that the dummy gun is forced mechanically to align itself with the ideal gun. Since both guns are constrained to each other axially and in training, any movement about their cross-tilt axes can only produce an alteration in their relative elevation settings. Follow-up gears are therefore fitted to the cross-tilting and elevation members of the dummy gun to transmit to the actual gun the proper gimbal settings about its corresponding trunnions. The cross-tilt follow-up gear 266—267—268 is exactly the same as in Fig. 10, while the elevation follow-up is similar, comprising a follow-up motor 261 housed in the dummy gun cradle 254 and driving an elevation quadrant 264 pivoted on the dummy gun trunnion 254', the quadrant also carrying the contact trolley 258 bearing against the two-part commutator 259—260 fixed to the dummy gun. The motors 261 and 269 also drive transmitters (not shown) whereby the appropriate gun settings are transmitted to the actual gun.

It will be seen that this method of constraint in training instead of in cross-tilt is mechanically simpler. Whether it is preferable on that account will depend on the mounting of the actual gun, as the larger cross-wise adjustment entailed by the simpler method may have countervailing disadvantages.

In Fig. 15 we have also illustrated the training control between the pedestal 21 and ideal gun turntable 220 already referred to, the training motor 135 receiving from the predictor the same training transmission as an actual gun and the pedestal 21 being rigidly attached to the deck. The system of training constraint between ideal and dummy guns, however, is equally applicable to a training pedestal of Fig. 14 type, the only difference being that in that case the ideal gun pedestal 220 and its bedplate 220' would be rigidly bolted to the pedestal 21, and the training control from the predictor would be applied to the training platform supporting the pedestal 21.

We claim:—

1. Fire control mechanism comprising a trainable pedestal subject to tilt, an element supported therefrom on gimbals and adapted to be levelled when the pedestal tilts, a crank disc pivoted on the pedestal and training equally and oppositely thereto, a crank pin adjustable on said disc in accordance with the direction and amount of tilt of the pedestal, a pantagraph connected at one end to said pin and at the other end to said element and pivoted at its centre on the pedestal equidistant between said pin and element, whereby by setting said crank pin in the direction of tilt of the pedestal and in radius proportional to the sine of the angle of said tilt, the element is levelled at all angles of train of the pedestal.

2. Fire control apparatus comprising a pedestal, a turntable pivoted thereon on a normally vertical training axis, two mutually perpendicular trunnions supported on the turntable by a universal coupling having a 1:1 velocity ratio in training, means to level said trunnions when the pedestal tilts, two members pivoted respectively on said trunnions, an arm gimballed on the point of intersection of the axes of said trunnions and connected to both said members so as to partake of the pivotal movements of both, a sighting device mounted on said turntable and having its line of sight controlled by a reflector gimballed on the turntable and controlled by said arm so that the line of sight of said device is parallel to said arm, and means to direct said line of sight continuously on a distant target by a training movement applied to the turntable with a further movement in training and elevation produced by tilting said reflector by means of angular displacements applied to said members around their respective trunnions.

3. Fire control apparatus comprising a pedestal liable to tilt, a turntable pivoted thereon on a normally vertical training axis, two mutually perpendicular and horizontal trunnion axes supported on said turntable by a universal pivotage having a 1:1 velocity ratio in training, means to level said axes when the pedestal tilts, two members pivoted respectively on said axes, an arm universally pivoted on the point of intersection of said axes and linked to both said members so as to partake of their rotary movements round said axes, an element gimballed on the turntable, means to preserve a fixed relation between said arm and element, a sighting device carried by the turntable and having its line of sight controlled angularly by said element, and means to transmit the training movement of the turntable and the angular movement of said members.

4. Fire control apparatus comprising a pedestal liable to tilt, a turntable pivoted thereon on a normally vertical training axis, two mutually perpendicular and horizontal trunnions supported on the turntable by a universal pivotal support having a 1:1 velocity ratio in training, means to level said trunnions when the pedestal tilts, two members pivoted respectively on said trunnions, an arm universally pivoted on the point of intersection of said trunnions and linked to both said members so as to partake of their rotary motions round said trunnions, an element gimballed on a part having training freedom relatively to said turntable, means to apply predetermined angular displacements to said members and a predetermined training movement to the turntable, means to align the element in a fixed angular relation to said arm, and means to transmit the training and gimbal movements of the element.

5. Fire control apparatus comprising in combination a sighting device, a pair of mutually perpendicular horizontal trunnions, means to determine the angular displacements of the line of sight of said device about each of said trunnions, an ideal gun arm pivotally movable round each of a second pair of horizontal and mutually perpendicular trunnions, means to apply to said ideal gun arm round each of said second set of trunnions predetermined displacements derived from the angular displacements of said line of sight about first said trunnions, a dummy gun arm pivoted on a miniature replica of a gun mounting, means to keep said ideal and dummy gun arms in a fixed relation to each other, and means to transmit the pivotal movements of the dummy gun arm and of the members of its mounting.

6. Fire control apparatus comprising a support liable to be tilted and adapted to be trained around a normally vertical axis which tilts with the support, a platform supported by the support on double gimbals and adapted to be levelled when the support tilts so that a training movement of the support about its tilted training axis trains the platform in azimuth by a like amount, means defining two intersecting trunnion axes attached to said platform and maintained horizontal by levelling the platform, two members pivoted for movement about said trunnion axes respectively, an arm pivoted on one of said members and engaging the other for universal angular movement about the point of intersection of said trunnion axes, and means for operating said members to control the movements of said arm about each of said trunnions.

7. Fire control apparatus comprising a turntable liable to tilt and trainable round a normally vertical axis which tilts with the turntable, a sighting device carried by the turntable and having a part movable relatively to the turntable for moving the line of sight of said device, a member supporting two sets of mutually perpendicular trunnions and adapted to be levelled when the turntable tilts, a sight arm pivoted for universal angular movement around the point of intersection of the axes of said trunnions, a connection between said sight arm and movable part to keep said sight arm parallel to said line of sight, and means to support said member pivotally from the turntable with a 1:1 velocity ratio in training between them, said means comprising an outer gimbal element trunnioned in the turntable on a normally horizontal trunnion axis, an inner gimbal element trunnioned on the member on an axis adapted to be levelled with the member and normally colinear with the first said gimbal trunnion axis, and a set of intermediate gimbal trunnions pivotally connecting said inner and outer gimbal elements along an axis at right angles to both of said gimbal trunnion axes and constrained to remain equally inclined to the training axis of the turntable and an axis at right angles to both said mutually perpendicular trunnions.

8. Fire control apparatus comprising a trainable pedestal, an outer gimbal element trunnioned on the pedestal on a normally horizontal trunnion axis, an inner gimbal element pivoted on the outer gimbal element on normally horizontal trunnions at right angles to said axis, a member pivoted on the inner gimbal element on an axis at right angles to said trunnions and normally at right angles to said first trunnion axis, a universal joint pivoted on the pedestal with its centre on the training axis of the pedestal, a second universal joint pivoted on the member with its centre on the pivot axis of said member, the centres of both universal joints being equidistant from the gimbal centre of the member, one trunnion of one universal joint being normally parallel to the corresponding trunnion of the other universal joint, and means to maintain the other trunnions of both universal joints parallel, said means comprising two forks pivoted respectively on said other trunnions, the other ends of said forks being hinged together on an axis parallel to both of said other trunnions.

9. Fire control apparatus comprising a trainable pedestal liable to tilt, a turntable carried by the pedestal and trainable relatively thereto about the training axis of the pedestal, two gimbal systems pivoted respectively on said pedestal and turntable, two platforms pivoted respectively on said two gimbal systems, a common means to level said platforms when the pedestal tilts, an element pivoted on the pedestal for training movement relatively thereto, and a connection between said element and said levelling means for adjusting the levelling means in accordance with the training movements of the pedestal.

10. Fire control apparatus comprising two trunnions with their axes intersecting at right angles, means to maintain both said trunnions horizontal to represent two intersecting horizontal coordinate axes, two members pivoted on said trunnions for movement about the respective axes thereof to represent planes pivoted on said coordinate axes, an arm trunnioned on one of said members and engaging the other for universal movement about the point of intersection of said trunnion axes and independently controlled by each of said members whereby the arm represents mechanically the line of intersection of said planes, means to control the azimuth of the arm by rotating said trunnions and members around a vertical axis, and means to control the direction of the arm through a limited range in elevation and azimuth by angular displacements applied to said members around said trunnions.

11. Fire control apparatus comprising a turntable, a platform supported thereon on gimbals, two trunnions carried by the platform with their axes intersecting at right angles, means to level the platform so that the said trunnions are horizontal to represent two horizontal coordinate axes, a sight arm mounted for angular displacement on and around each of said trunnions independently, a frame gimballed on the turntable, a sighting device having some of its optical parts carried by the turntable and an optical part carried by said frame, said last part controlling the direction of the line of sight of said sighting device, and means to control said line of sight relatively to said coordinate axes, last said means comprising a connection between said sight arm and frame to maintain said line of sight in a fixed angular relation to the direction of the arm and means to angle the sight arm independently about each of said trunnions.

12. Fire control apparatus comprising a turntable liable to tilt, two mutually perpendicular horizontal trunnions pivotally supported by the turntable and adapted to be levelled when the turntable tilts, two members pivoted respectively for rotation about said trunnions, a sight arm pivoted on one of said members for universal angular movement about the point of intersection of the axes of said trunnions, said arm being connected to the other of said members whereby it is controlled by each of said members for angular movement therewith, a sighting device carried by the turntable, and a connection between said sight arm and sighting device to maintain the line of sight of the sighting device parallel to the sight arm.

13. Fire control apparatus comprising a sighting device having the direction of its line of sight displaceable by angular movement of one of its optical parts relatively to its remaining optical parts, and means to control the said line of sight relatively to two coordinate axes independent of the sighting device, said means comprising two trunnions with their axes intersecting and pointing in the directions of the said coordinate axes, two members pivoted respectively on said trunnions, a sight arm pivoted on one of said members and connected to the other whereby it may move about the point of intersection of said trunnion axes and connected by a parallel-linkage mechanism connecting said arm to the said angularly movable optical part so that the line of sight of the sighting device is parallel to the sight arm, and means to rotate each of said members about its respective trunnion whereby to impart to the sight arm the said rotary movements of the two members.

14. Fire control apparatus comprising a support liable to tilt, a platform pivoted on the support, two trunnions carried by the platform with their axes intersecting to represent two coordinate axes, an arm pivoted for universal angular movement about each of said trunnions and angularly controllable about each to represent a direction in space whose angular position relatively to said coordinate axes is known, a second arm gimballed on the support and controlled parallel to said first arm to the effect that if the support is tilted and the said trunnions are levelled the second arm and its gimbal system will determine the gimbal angles relatively to the tilted support of the direction in space denoted by the first arm in relation to the levelled trunnions, and means to produce the said effect without levelling the said trunnions, said means comprising an arrangement of the trunnions, gimbal system, both arms and interconnections between said arms whereby the second arm has a training displacement of 180° from the known direction in space together with means to tilt the said trunnions relatively to the pedestal through the angle of tilt of the pedestal and in the same direction.

15. Fire control apparatus comprising a pedestal liable to tilt, a turntable mounted on and trainable relatively to the pedestal, a platform pivoted on said turntable, two mutually perpendicular trunnions carried by said platform with their axes intersecting at right angles, an arm pivoted for angular movement about each of said trunnions, and means to determine the angular relation between a known elevated direction in space and two known horizontal coordinate axes, last said means comprising means to train the turntable and means to level the platform and trunnions so that the said coordinate axes, means to angle the said arm about each of the trunnions into parallelism with the said direction in space, and means to determine the angular movements of the arm about each of the levelled trunnions.

16. Fire control apparatus comprising a turntable liable to tilt, a platform universally pivoted on said turntable, two trunnions carried by the platform with their axes intersecting, an arm pivoted for angular movement on and about each of said trunnions, and means to materialize a direction in space known relatively to two horizontal coordinate axes, said last means including means to level the platform when the pedestal tilts so that the trunnions are horizontal and represent the said coordinate axes and means to apply to the arm determinable displacements about each of said trunnions so as to maintain the arm parallel to said direction in space.

17. Fire-control apparatus comprising two trunnions with intersecting axes and fixed relatively to each other, means to maintain both said trunnions horizontal, means to rotate both trunnions about a vertical axis, an arm pivoted for angular movement about each of said trunnions while so maintaining both said trunnions horizontal, and means to point the said arm in any direction by angling it about each of said trunnions and by rotating said horizontal trunnions about said vertical axis.

18. Fire control apparatus comprising a pedestal liable to tilt, a platform pivoted on the pedestal and supporting two trunnions with their axes intersecting, two members pivoted respectively on said trunnions, an arm pivoted for universal angular movement about the point of intersection of said trunnion axes and linked to each of said members for angular movement therewith, and means to maintain said trunnions horizontal irrespective of the tilt of the pedestal and the angular position of said members and arm.

19. Fire control apparatus comprising a turntable trainable about a normally vertical axis, a platform pivoted thereon by a gimbal system providing a 1:1 velocity ratio in training between the turntable and platform irrespective of tilt between the pedestal and platform, two trunnions carried by the platform with their axes intersecting, two members pivoted on one member and linked to the other respectively on said trunnions, an arm pivoted for universal angular movement about the point of intersection of said trunnion axes, means to level the platform to maintain both said trunnions horizontal when the pedestal tilts, and means to train said trunnions, members and arms about a vertical axis by training the turntable about its normally vertical training axis.

20. Fire control apparatus comprising means to define the angular relation between two horizontal coordinate axes and two planes pivoted respectively thereon and rotated so as to intersect along a given direction in space, said means comprising a pivoted platform carrying two trunnions with their axes intersecting at the same angle as said coordinate axes, means to level the platform so that said trunnions are horizontal, two members pivoted respectively on said trunnions, an arm mounted on one of said members and linked to the other for universal angular movement about the point of intersection of said trunnion axes, so that angular movement of each member about its respective trunnion is communicated equally to the arm, means to align the arm with the said direction in space by angling the said members about their respective trunnions, and means to determine the angular movements of each of said members.

21. Fire control apparatus for determining the settings to be applied to a gun and the members of its mounting to align the gun with a given direction in space known with reference to two given horizontal coordinate axes, comprising a pedestal representing a gun platform, two trunnions pivotally supported by the pedestal, said trunnions having their axes intersecting at the same angle as said known coordinate axes, means to maintain said trunnions horizontal to represent the said coordinate axes, an ideal gun arm pivoted for universal angular movement about the point of intersection of said trunnion axes and means to control said ideal gun arm relatively to both trunnions so that it represents relatively thereto the position of said known direction in space relatively to said coordinate axes, a dummy gun element pivoted on the pedestal on a gimbal system having its gimbal trunnions arranged similarly to the pivot trunnions of a gun mounting, means to maintain the dummy gun element parallel to the ideal gun arm, and means to determine the resultant angular movements of the dummy gun element relatively to its gimbal system, of the gimbal system relatively to the pedestal, and of the members of the gimbal system relatively to each other.

22. Fire control apparatus comprising a turntable, two horizontal trunnions carried thereby with their axes intersecting, an arm angularly movable round each of said trunnions, a gimbal system pivoted on the turntable, an element pivoted on said gimbal system, a sighting device carried by the turntable and having its line of sight controlled in elevation by said element, a connection between said arm and gimballed element, and means to control the direction of said line of sight by angling the arm about said horizontal trunnions.

23. Fire control apparatus comprising a turntable, a platform pivotally supported by the turntable, two trunnions carried by the platform with their axes intersecting, means to level said platform to maintain said trunnions horizontal irrespective of tilt of the turntable, two members pivoted respectively on said trunnions, an arm mounted on one member and linked to the other for universal angular movement about the point of intersection of said trunnion axes, said arm moving angularly with each of said members, a sighting device carried by the turntable, and means to control the said device to maintain the line of sight at all times parallel to said arm.

24. Fire control apparatus comprising two trunnions arranged with their axes intersecting and fixed relatively to each other, means to maintain said trunnions horizontal, an arm mounted for universal angular movement about the point of intersection of said trunnion axes, means to apply to said arm angular displacements about each of said trunnions independently, a gimbal system, a second arm pivoted on said gimbal system and controlled by said first arm in a fixed angular relation thereto, and means to point the said second arm in the said angular relation to any direction in space by applying to the first arm angular displacements about each of said horizontal trunnions to align the first arm with the said direction.

25. Fire control apparatus comprising a sighting device, two trunnions maintained in a fixed horizontal plane and having their axes intersecting, an element pivoted for universal angular movement about the point of intersection of said trunnion axes, means to rotate the said element separately about each of said trunnions, a connection between said element and sighting device to keep the line of sight of said device parallel to the element, and means to determine the angular rotations of the element about each of said trunnions to direct said line of sight at a given target.

26. Fire control apparatus comprising two trunnions having their axes intersecting at the same angle as two coordinate axes, means to maintain said trunnions parallel to said coordinate axes, an element pivoted for universal angular movement about the point of intersection of said trunnion axes, a dummy gun and gun mounting having pivotal axes parallel to the pivot axes of a real gun and mounting, means to apply to the element relatively to each of said trunnions the known angular displacements of the required direction of the gun axis relatively to said coordinate axes, means to keep the dummy gun parallel to the element, and means to determine the pivotal displacements of the dummy gun and of the several parts of its said mounting about each of said pivotal axes.

27. Fire control apparatus comprising an ideal gun pivoted on gimbals, a dummy gun independently pivoted on other gimbals, means to cause the dummy gun to align itself parallel to the ideal gun, and means to limit to one the number of possible positions of the dummy gun gimbals in any given position of the ideal gun and its gimbals, said means comprising a connection between the two systems of gimbals to keep one gimbal trunnion of the dummy gun parallel to the corresponding gimbal trunnion of the ideal gun.

28. Fire control apparatus comprising a pedestal trainable about an axis liable to tilt, a turntable pivoted on the pedestal for training movement relatively thereto, a platform gimballed on said turntable, and means to level the platform when the pedestal training axis tilts and to maintain it horizontal when the pedestal is trained round said tilted axis, said means comprising an element trainable relatively to the pedestal about an axis parallel to the pedestal training axis, a part carried by said element and adjustable relatively thereto in accordance with the tilt of the pedestal training axis, a connection between said part and said platform for levelling the platform and means to train the element relatively to the pedestal equally and oppositely to training movements of the pedestal.

29. Fire control apparatus comprising a turntable liable to tilt, a sighting device having some of its optical parts mounted on the turntable in fixed relation thereto and an optical part controlling the line of sight of said device pivoted on the turntable for independent angular movement relatively thereto, a platform pivoted on the turntable and carrying two trunnions with their axes intersecting at right angles, means to level said platform when the turntable tilts so that both said trunnions are horizontal, two members pivoted on said trunnions, a sight arm pivoted on one of said members and engaging the other so as to be movable angularly about both said levelled trunnions, and a connection between said sight arm and independently movable optical part for maintaining the sight arm and line of sight parallel.

ARTHUR LEONARD PERHAM.
JAMES BLACKLOCK HENDERSON.